United States Patent
Steiner et al.

(10) Patent No.: US 8,321,497 B1
(45) Date of Patent: Nov. 27, 2012

(54) DATA STRUCTURE DISPOSED IN A COMPUTER READABLE MEMORY THAT PROVIDES INFORMATION CORRESPONDING TO A LOCATION

(75) Inventors: Glenn Steiner, Los Altos, CA (US); Cyril Brignone, Mountain View, CA (US); Salil Pradhan, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1049 days.

(21) Appl. No.: 10/698,708

(22) Filed: Oct. 30, 2003

Related U.S. Application Data

(63) Continuation-in-part of application No. 09/836,924, filed on Apr. 17, 2001, now Pat. No. 7,299,256.

(51) Int. Cl.
*G06F 15/16* (2006.01)
*H04W 24/00* (2009.01)

(52) U.S. Cl. ..................... 709/203; 455/456.1

(58) Field of Classification Search .................. None
See application file for complete search history.

(56) References Cited

U.S. PATENT DOCUMENTS

| | | | | | |
|---|---|---|---|---|---|
| 5,890,170 | A | * | 3/1999 | Sidana | 715/207 |
| 5,995,929 | A | * | 11/1999 | Gupta | 704/251 |
| 6,122,520 | A | * | 9/2000 | Want et al. | 455/456.2 |
| 6,128,482 | A | * | 10/2000 | Nixon et al. | 455/414.1 |
| 6,173,239 | B1 | | 1/2001 | Ellenby | |
| 6,775,670 | B2 | * | 8/2004 | Bessette | 707/10 |
| 6,961,555 | B1 | * | 11/2005 | Philyaw | 455/403 |
| 7,007,228 | B1 | | 2/2006 | Carro | 715/210 |
| 7,035,896 | B1 | * | 4/2006 | Schneider | 709/202 |
| 7,330,883 | B1 | * | 2/2008 | Jessup et al. | 709/224 |
| 2001/0046228 | A1 | * | 11/2001 | Tahtinen et al. | 370/389 |

* cited by examiner

*Primary Examiner* — Krista Zele
*Assistant Examiner* — Azizul Choudhury

(57) ABSTRACT

A data structure disposed in a computer readable memory provides information corresponding to a location. The data structure includes a first data field for identifying the location and a second data field associated with the first data field containing information corresponding to the location.

26 Claims, 16 Drawing Sheets

DATA STRUCTURE DISPOSED IN A COMPUTER READABLE MEMORY THAT PROVIDES INFORMATION CORRESPONDING TO A LOCATION

RELATED UNITED STATES APPLICATION

This Application is a Continuation in Part of related U.S. patent application Ser. No. 09/836,924, now U.S. Pat. No. 7,299,256, issued on Nov. 20, 2007, by Salil Pradhan, et al., filed on Apr. 17, 2001 entitled "Creating a Virtual Link Between a Physical Location and its Web Representation", and assigned to the assignee of the present invention.

FIELD OF THE INVENTION

Embodiments of the present invention relate to the field of networking. More specifically, embodiments of the present invention relate to a data structure disposed in a computer readable memory that provides information corresponding to a location.

BACKGROUND OF THE INVENTION

The convergence of advances in the fields of networking, wireless communications, mobile computing, and the Internet, has made it technologically feasible to provide virtually any type of information and/or services to individuals at virtually anytime and any place. It is envisioned that small, unobtrusive devices can be set up to transmit specific information regarding an object, business, or point of reference associated with that particular device. These devices serve as "information access points" (IAPs) for providing specific, localized information. A passerby, can access this information by pointing his or her personal communications device, such as a cell phone, personal digital assistant, or any type of mobile computing device, at the IAP device and download the transmitted information.

For example, a painting at a museum could have an associated IAP device which continuously broadcasts information regarding that painting. A visitor to the museum who is interested in that painting, could then direct his or her portable communications device at the IAP device to receive textual, audio, and/or visual information regarding that painting. Alternatively, the IAP device could provide the visitor with a URL or some type of pointer to a web site which has the desired information. Furthermore, that person may be interested in finding where other paintings by that same artist may be found in the museum. This would require that the IAP devices have known physical locations (e.g., latitude and longitude). It would be of great benefit were most, if not all, IAP devices to have known locations. An individual could then be directed to the nearest restaurant, restroom, bus stop, hospital, newsstand, ATM machine, pay phone, etc., by virtue of the IAP devices. IAPs thus serve as an informational beacon.

Physical IAP beacons have been used for attracting attention to and providing information, such as a URL about a particular location deploying it. Physical beacons however can have inherent limitations due to their physical character. For instance, physical beacons must be manually placed, and if necessary, manually repositioned. They must also be manually programmed with their associated URL, and manually reprogrammed if the URL changes. Further, physical beacons are not dynamic or responsive to changes in their environment. For example, a physical beacon associated with an item placed on sale will not shut off if the item is out of stock. The performance of physical beacons can be sensitive to environmental constraints such as temperature, humidity, shock and vibration, and power problems (such as AC power failure or a battery running down) and they can be damaged thereby. Further still, physical beacons that require visible (e.g., line of sight) source detection such as infrared, barcode, Watermark, etc., can be blocked by other physical objects. For example, a line of sight source detection physical beacon can be accidentally blocked if a large truck parks in front of a store displaying the beacon; malicious blocking is also not inconceivable.

Virtual beacons comprise a point in three dimensional space such as a geographic location with an associated URL. Virtual beacons are typically electronically created and maintained, such as by a computing system on the Web. Virtual beacons have advantages over corresponding physical beacons. Such advantages accrue to virtual beacons because of the limitations inherent in physical beacons discussed above. The point in three-dimensional space comprising a virtual beacon is typically associated with a physical object such as a building or other structure, a point of interest, or a sign such as an advertising billboard. A device can be enabled to respond to a virtual beacon. One such device enablement is WebSign™ (by Hewlett Packard, a corporation in Palo Alto, Calif.).

A virtual beacon enabled device can be pointed at the physical object, point of interest, or sign associated with the point in three dimensional space. When so pointed, the device can detect the virtual beacon associated therewith and its associated URL. The device can then retrieve an associated Web page, as directed by the URL. This allows a user to obtain useful information relevant to the physical object, point of interest, or sign associated with the point in three dimensional space. To be effective, a virtual beacon enabled device will respond to a virtual beacon and retrieve its associated URL when the geographic location (e.g., latitude and longitude) of the associated physical object, point of interest, or sign falls within a search window of the device. The search window can correspond to the device being within some maximum range of the virtual beacon. The virtual beacon will then transmit to the device the latitude and longitude and/or another geographic location identity to the device, as well as the associated URL.

There exist many different ways by which to establish a beacon's location. One method entails utilizing traditional surveying techniques to fix the location of an IAP device. Unfortunately, this method is quite time consuming and expensive. As such, traditional surveying techniques are typically limited to known landmarks or to locations of significance. It would be cost prohibitive to survey in each and every one of the multitudes of IAP devices. Another method entails using the Global Positioning System (GPS) to establish the locations of IAP devices. However, GPS generally requires a direct line-of-sight to several of the orbiting satellites. Consequently, GPS cannot be used to establish the locations of indoor IAP devices. Another commonly used technique involves cellular triangulation. Unfortunately, cellular triangulation has limited accuracy (e.g., 100 meters for standard cell sizes and less than 25 meters for microcells). Furthermore, cellular triangulation is susceptible to multi-pathing problems indoors.

Whatever technique is utilized to establish a beacon's location, conventional beacons are static in their area of coverage. A static beacon however lacks the capability to change the information it provides in response to changing or variable factors, conditions, criteria, situations, occurrences and sequences of occurrences, and circumstances. Further, static conventional lack directionality and thus do not change their information despite the fact that a user may be close to the location of the beacon, or even at the location, but not immediately accessible to the beacon. Such absence of directionality can be misleading in a situation where a user is at the beacon location, but the location remains inaccessible to the user. Static beacons are also have static locations, such that the beacon is fixed in three dimensional space. Thus, the beacons are unable to move, despite the fact that a user who left the beacon for another user may have changed position.

SUMMARY OF THE INVENTION

A data structure disposed in a computer readable memory provides information corresponding to a location. The data structure comprises a first data field for identifying the location and a second data field associated with the first data field containing information corresponding to the location.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

A data structure disposed in a computer readable memory providing information corresponding to a location is disclosed. In the following detailed description of the present invention, numerous specific details are set forth in order to provide a thorough understanding of the present invention. However, it will be obvious to one skilled in the art that the present invention may be practiced without these specific details or by using alternate elements or methods. In other instances well known methods, procedures, components, and circuits have not been described in detail as not to unnecessarily obscure aspects of the present invention.

A flexible data structure corresponding to one embodiment of the present invention provides a dynamic ability to correlate information that is pertinent to a user with a location. The data structure can be dynamic in its area of coverage, unlike static conventional IAPs and physical beacons. Further, the capability to change the information the data structure provides in response to changing or variable factors, conditions, criteria, situations, occurrences and sequences of occurrences, and circumstances is provided. These and other advantages of embodiments of the present invention, a data structure disposed in a computer readable memory providing information corresponding to a location, are discussed herein.

Section I

Embodiments of the present invention relate to a data structure disposed in a computer readable memory providing information corresponding to a location. The description of specific features of the data structure disposed in a computer readable memory providing information corresponding to a location commences at Section II with FIG. 8A. Presented first, Section I, FIGS. 1-7 represent a discussion of creating a virtual link between a physical location and its web representation, which provides an exemplary system for creating a data structure disposed in a computer readable memory providing information corresponding to a location.

Figure 1:
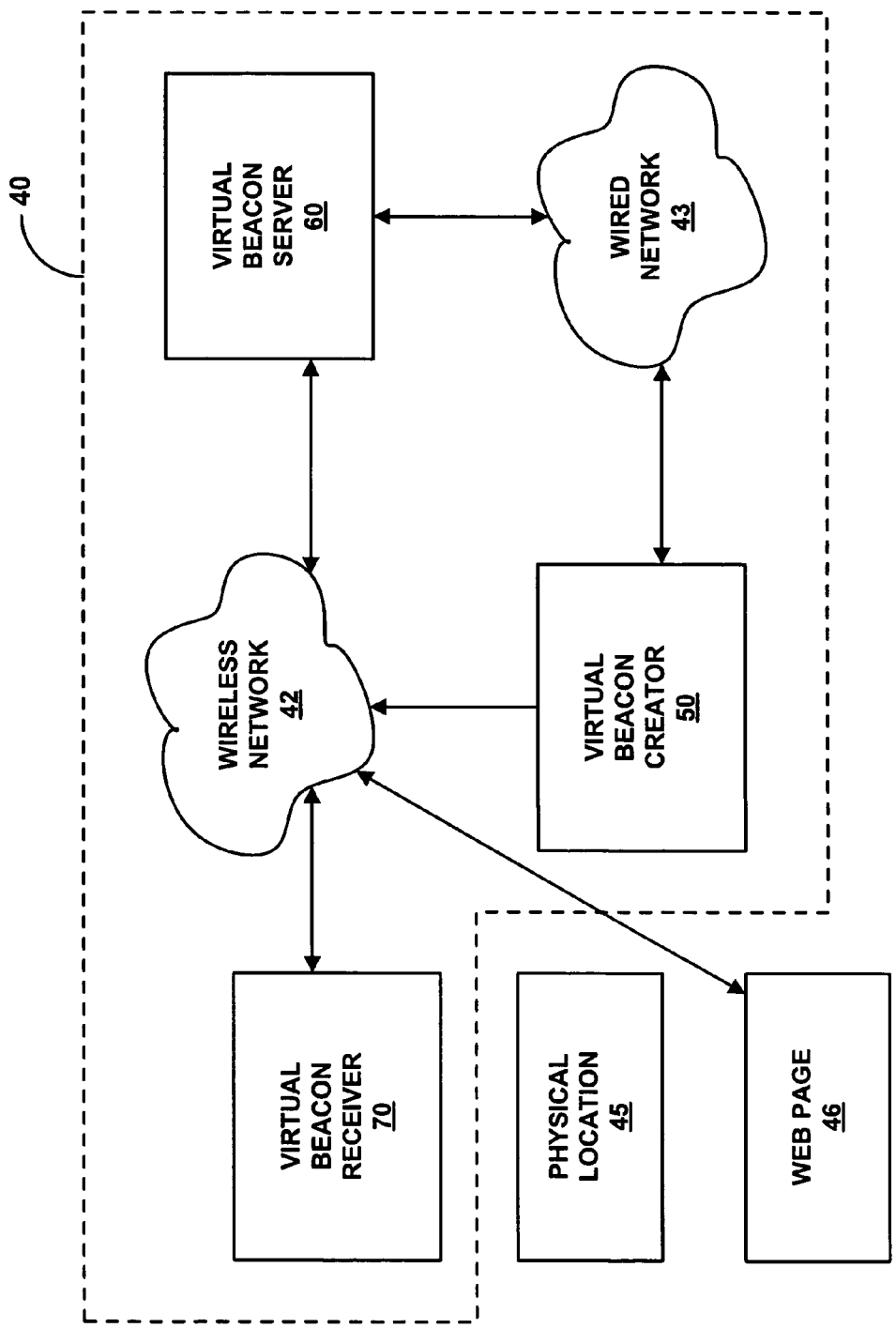
FIG. 1 shows a web navigation system that implements one embodiment of the present invention, wherein the system includes a virtual beacon creator, a virtual beacon server, and a virtual beacon receiver.

FIG. 1 shows a web navigation system 40 that implements one embodiment of the present invention. The web navigation system 40 includes a virtual beacon creator 50, a virtual beacon server 60, and a virtual beacon receiver 70. A wireless network 42 is used for communications among the above mentioned systems 50, 60, and 70. In addition, a wired network can be used for communication between the virtual beacon creator 50 and the virtual beacon server 60, and/or between the systems 50, 60, and 70. Wireless network 42 is used to exemplify one network medium upon which embodiments of the present invention may be practiced. However, the present invention is not limited to use with wireless networks. Embodiments of the present invention are well suited to use with any network connection modality. As used herein, unless otherwise stated to the contrary the term "wireless" is used to exemplify other connection modalities, as well.

The virtual beacon creator 50 can also be referred to as a virtual link creator. The virtual beacon server can also be referred to as a virtual link server. In addition, the virtual beacon receiver 70 can be referred to as a virtual link receiver or a receiver.

FIG. 1 also shows a physical location 45 and a web page 46 hosted in a content web server (not shown). The web page 46 can be accessed via the wireless network 42 by the virtual beacon receiver 70. This means that the virtual beacon receiver 70 has Internet access capability. The web page 46 is related to the physical location 45. This means that the physical location 45 is represented in the virtual world by the web page 46. Alternatively, the physical location 45 has two or more web pages and the web page 46 represents two or more physical locations. Web page 46 (and other Web pages) can be cached. Beacon rules can be executed locally (e.g., on a user's device). Beacon rules can be executed locally, in one embodiment, with a secured database and run with secured algorithms (e.g., processes).

In accordance with one embodiment of the present invention, the web navigation system 40 bridges the physical real world and the virtual world together such that easy, quick, and convenient web navigation is achieved with minimized physical effort for the bridging. The web navigation system 40 achieves this by allowing the web address of the web page 46 for the physical location 45 to be virtually posted at the physical location 45 without employing any physical object (e.g., a physical beacon, a display screen, or a poster) to post the web address at the physical location 45. This means that the web navigation system 40 provides a virtual beacon (or virtual link) (e.g., the virtual beacon 91 in FIG. 5) that functions to post, display, or broadcast the web address of the web page 46 at the physical location 45.

Hereinafter, the term "physical beacon" refers to an electronic device or module that stores a web address and can transmit or broadcast the stored web address. The term "virtual beacon" or "virtual link", however, does not refer to any physical object such as the physical object such as the physical beacon. Instead, this term refers to an electronic file that contains the web address. The electronic file, however, serves the similar function as the physical beacon. The virtual beacon or virtual link can also be referred to as a web-sign.

In addition, the term "physical location" refers not only to a geographical location, but to a physical entity as well. As described above, a physical entity can be a bookstore, a museum, a conference room, a hotel room, or an item displayed at the bookstore or museum. The physical entity can also be a convention center, a car displayed at the convention center, or a bus terminal or stop.

Although the term "physical location" refers to both the three dimensional (and other) geographical location as well as physical entity, there is no confusion because every geographical location has a unique positional data (e.g., latitude is "53.456789" and longitude is "123.456789"). This is also true for any physical entity located at a geographical location. In this case, the physical entity assumes the positional data of the geographical location at which the physical entity is located. This allows the term "physical location" to refer to either the geographical location or a physical entity at a geographical location. The physical location 45 can be referred to using the street address (e.g., 1501 Page Mill Road, Palo Alto, Calif.), or the unique positional data. But if the street address is used to refer to the location 45, map data can be stored to convert the street address into the actual positional data. In one embodiment, a relative positioning system can be used, wherein relevant objects can be positioned in relation to a local geographical reference point.

As will be described in more detail below, the virtual beacon creator 50 creates the virtual beacon 91 for the physical location 45. The virtual beacon 91 is essentially a location-based electronic file (e.g., the file 92 in FIG. 5). This means that the electronic file 92 contains the positional data of the physical location 45 and the web address of the web page 46. In addition, other data (e.g., access range, direction, name of the web address, time range during which the virtual beacon is active) may also be included in the electronic file 92 that forms the virtual beacon 91. The location-based electronic file 92 is then sent by the virtual beacon creator 50 to the virtual beacon server 60 via either the wireless network 42 or the wired network 43. Each of the networks 42 and 43 employs an open standard communication protocol (e.g., the Hyper Text Transport Protocol (http)) for communication. Thus, each of the networks 42-43 is an Internet network. In one embodiment, information can be passed via a private network, which can use a private protocol, in a similar manner.

The virtual beacon server 60 then sends the virtual beacon electronic file 92 to any external receiver system (e.g., the receiver system 70) via the wireless network 42 when the external receiver system is at a particular location and sends a request for all virtual beacon files that have positional data indicating locations that are near the location at which the receiver system is currently located. For example, when the receiver system 70 is near the physical location 45 and requests to receive all virtual beacon files that contain positional data indicating locations that are near the location at which the receiver system 70 is located, the virtual beacon server 60 will send the virtual beacon electronic file 92 to the receiver system 70. The receiver system 70 then uses the web address contained in the virtual beacon electronic file 92 to access the web page 46, thus allowing the web address of the web page 46 to be virtually posted at the physical location 45 without employing any physical object to host the web address at the physical location 45. This makes the virtual beacon 91 a virtual link or virtual beacon which is not physically located at the physical location 45. The web navigation system 40 will be described in more detail below, also in conjunction with FIGS. 2-8.

Figure 4:
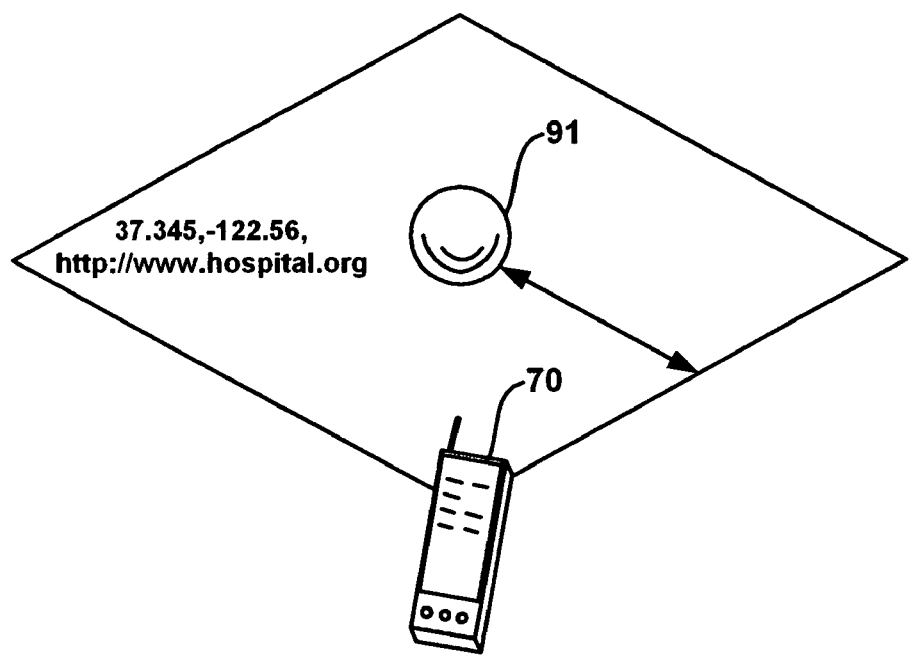
FIG. 4 illustrates one exemplary virtual beacon created by the virtual beacon creator of FIGS. 1-3, according to one embodiment of the present invention.

As can be seen from FIGS. 1 and 4, the virtual beacon creator 50 creates the virtual beacon 91 by creating the electronic file 92 (both shown in FIG. 5) for the physical location 45. As described above, the virtual beacon 91 is not a physical object, but rather a location-based electronic file (e.g., the electronic file 92) that contains data. The data contained in the virtual beacon electronic file 92 include a positional data of the physical location 45 (e.g., latitude="37.345" and longitude="−122.56"). An altitude can be added as well (e.g., altitude="123"). In addition, the data contained in the electronic file 92 also include an access range data (e.g., range=2000 feet), a tag or label data (e.g., <label>=the hospital). Moreover, other data may also be included. For example, the data in the electronic file 92 may include a directional data specifying the direction or orientation of the beacon projection of the virtual beacon 91, as well as time range data indicating the times during which the virtual beacon 91 is active. The beacon projection means the direction at which the virtual beacon electronic file 92 can be received by an external receiver system (e.g., the receiver system 70) at or near the location of the virtual beacon 91. These other data can be collectively referred to as control data, property data, or control information.

Figure 3:
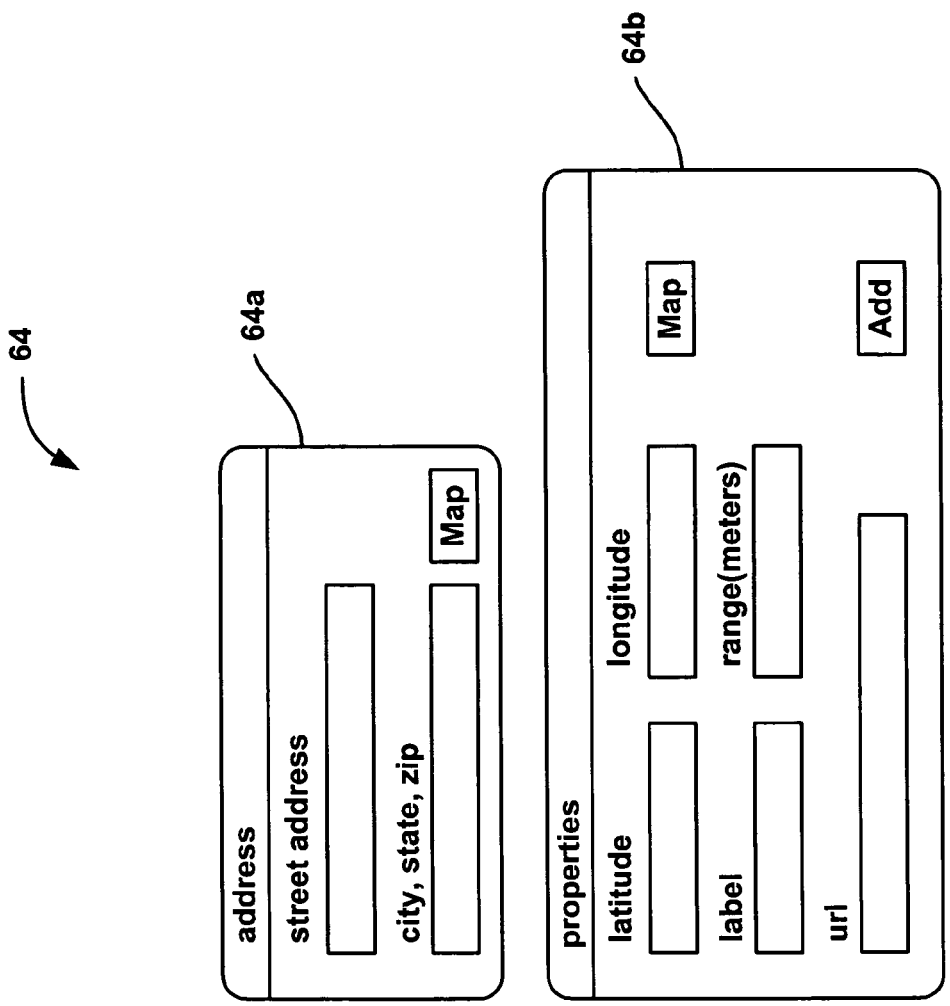
FIG. 3 shows the user interface of the virtual beacon creator of FIG. 2 for receiving user inputs, according to one embodiment of the present invention.

In one embodiment, the virtual beacon creator 50 of FIG. 1 can be implemented by a computer system with communication functions with external networks. In other embodiments, the virtual beacon creator 50 can be implemented by software, hardware, or firmware. FIG. 3 shows the structure of the virtual beacon creator 50, which will be described in more detail below.

Figure 2:
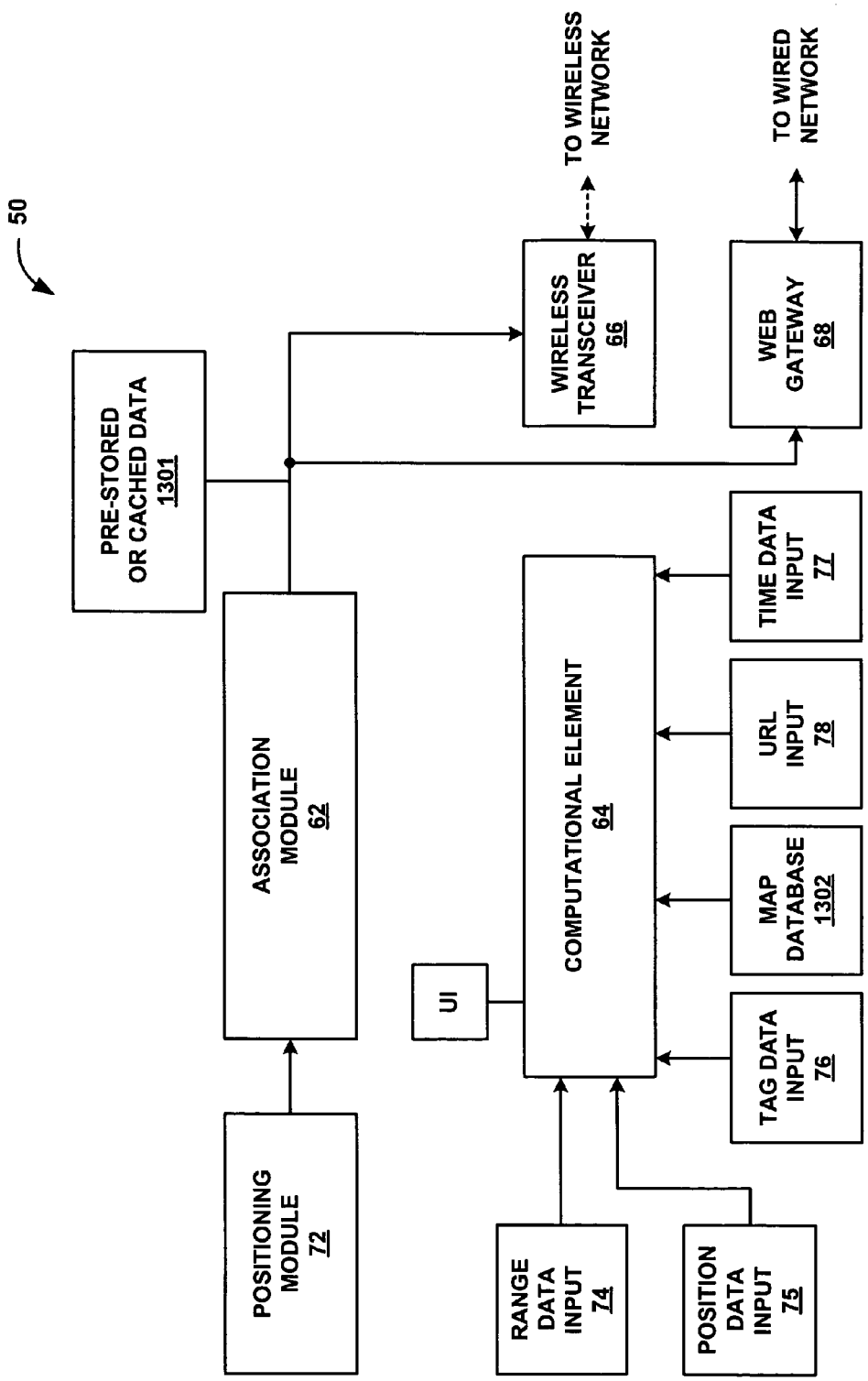
FIG. 2 is a block diagram showing the structure of the virtual beacon creator of FIG. 1, according to one embodiment of the present invention.

In FIG. 2, the virtual beacon creator 50 includes an association module 62, a user interface 64, a wireless transceiver 66, a web gateway 68, a positioning module 72, and a computing element (e.g., processor) 99. The user interface 64 is used to interact with the user of the virtual beacon creator 50, and to receive user inputs 74-78 of data that will be used to form the virtual beacon electronic file 92. As can be seen from FIG. 3, the user inputs include a range data input 74, a position data input 75, a tag/label data input 76, a time data input 77, and a web address (e.g., URL) data input 78. In addition, the user interface 64 may also access a map data database 79. This database 79 is used when the position data input 75 is actually an address input (e.g., "3000 History Street, Palo Alto, Calif."). In this case, the user interface 64 accesses the database 79 to convert the address input into the positional data (e.g., latitude="12.345" and longitude="89.123"; an altitude can also be part of the positional data).

FIG. 3 shows one example of the user interface 64. The user interface 64 provides the interface (e.g., 64a) for address input and the interface (e.g., 64b) for positional data input. The interface 64b also includes fields for other user data inputs (e.g., range, time, label, web address).

Referring back to FIG. 2, the association module 62 receives all the user inputs 74-78 from the user interface 64. The association module 62 then forms the electronic file 92 (FIG. 4) that represents the virtual beacon 91. The electronic file 92 contains (1) the positional data of the physical location 45 (FIG. 1) at which the virtual beacon 91 is created or specified and (2) the control data (e.g., the web address of the web page 46 (FIG. 2) associated with the physical location 45 (FIG. 2), the access range of the virtual beacon 91, and the tag/label of the web address, etc.). The association module 62 can be implemented using known technology.

The positioning module 72 is employed to provide the positional data of the current position of the creator 50. This allows the association module 62 to require no positional data input from the user interface 64 when creating a virtual beacon file. In this case, the user of the creator 50 only needs to indicate that the virtual beacon takes the current position of the creator 50. In one embodiment, the positioning module 72 is a Global Positioning System (GPS) receiver module. Alternatively, the positioning module 72 can be implemented using other known technology. For instance, position can be determined via a range and pair of angles relative to a user's position, such as by using angular positioning devices and/or range finding devices.

Referring to FIGS. 1, 2 and 4, the location-based electronic file 92 is then sent by the virtual beacon creator 50 to the virtual beacon server 60 via either the wireless network 42 or the wired network 43. Each of the networks 42 and 43 can employ an open standard communication protocol such as the HyperText Transport Protocol (HTTP) for communications, or a private protocol. Thus, each of the networks 42-43 is an Internet network or a private network. The virtual beacon electronic file 92 received by the server 60 from the creator 50 are in a format such as the Extensible Markup Language (XML). Alternatively, other known web data formats may be employed for the virtual beacon electronic file 92.

The transmission from the virtual beacon creator 50 is dependent on the connection of the creator 50 with the external server 60. If the creator 50 is connected to the wired network 43, then the web gateway 68 is used to transmit the electronic file 92 created by the creator 50. If the creator 50 is connected to the wireless network 42, then the electronic file 92 is transmitted by the wireless transceiver 66. If the creator 50 is connected to both networks 42-43, then the electronic file 92 can be sent by either network. The wireless transceiver 66 can be implemented using known technology and the web gateway 68 can be implemented using known technology.

Referring back to FIG. 1, when the virtual beacon server 60 receives the location-based electronic file 92 representing the virtual beacon 91 (both shown in FIG. 5) for the physical location 45, the server 60 stores the electronic file 92. When requested, the server 60 sends the electronic file 92 to the requesting receiver (e.g., the receiver 70). The server 60 sends the virtual beacon files it has stored either in the web format (e.g., XML format) or in the email format. Thus, the server 60 is basically a combination of a web server and an email server. The server 60 has a web address so that remote systems having web browsing capability can access the server 60. In addition, the server 60 also has an email address. The structure of the server 60 is shown in FIG. 5, which will be described in more detail below.

Figure 5:
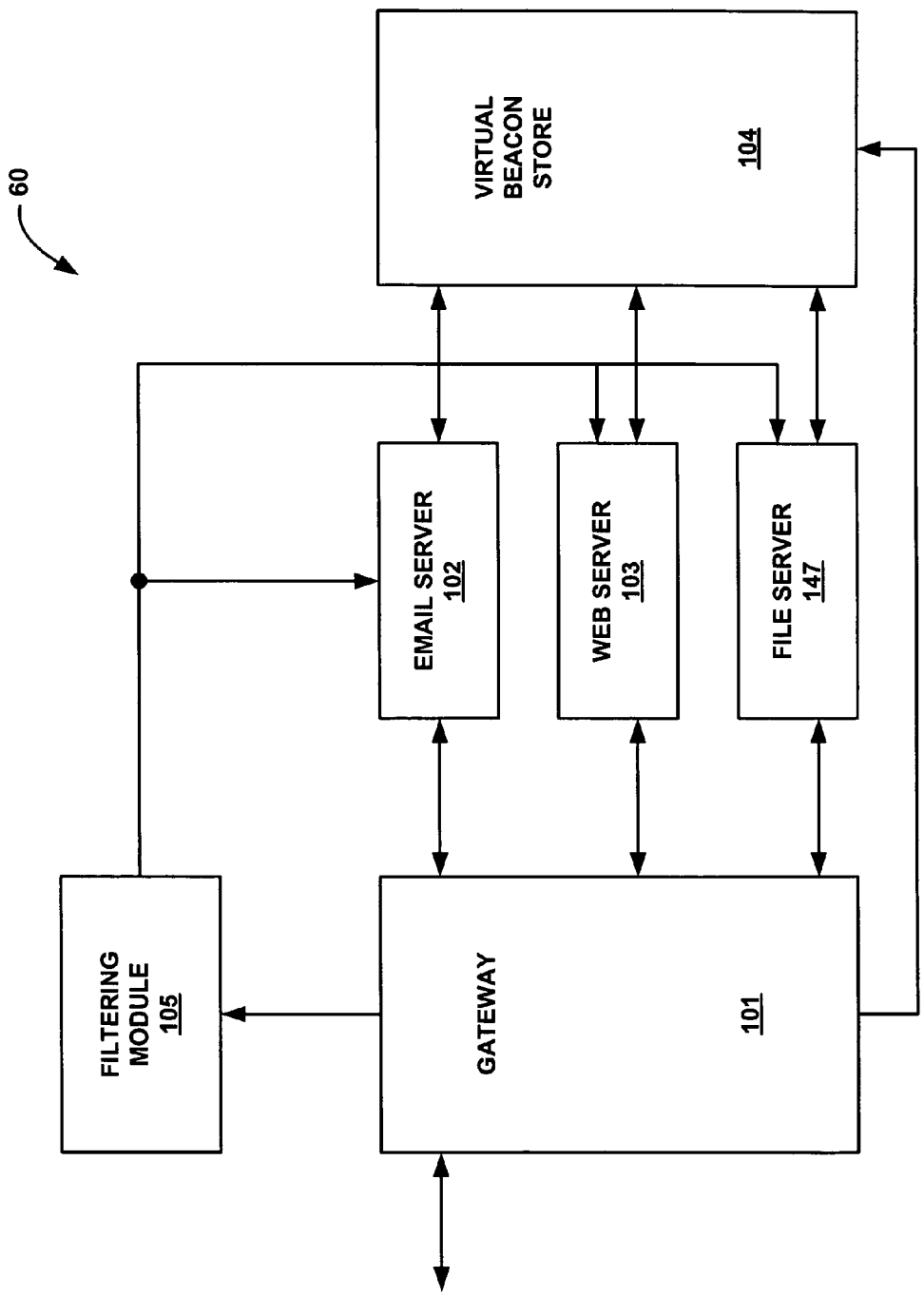
FIG. 5 shows the structure virtual beacon server of FIG. 1, according to one embodiment of the present invention.

In FIG. 5, the server 60 includes a gateway 101, an email or other server 102, a web server 103, a file server 147, a virtual beacon store 104, and a filtering module 105. Alternatively, the server 60 can function without some of the above mentioned modules. For example, the server 60 may not have the filtering module 105 or the email module 102. The gateway 101 is used to interface the server 60 with the networks 42 and 43 (FIG. 2). Thus, the gateway 101 is also an Internet-enabled gateway. Gateway 101 can also be a proprietary protocol gateway.

The email or other server 102 is used to send virtual beacon electronic files (e.g., the file 92 of FIG. 4) to remote receivers (e.g., the receiver 70 of FIG. 2). The email or other server 102 has an email or other address and can send the virtual beacon files in e-mail or another format. The email or other server 102 can be implemented using known technology. The email or other server 102 is typically using to delivery the virtual beacon files stored in the store 104 to a remote receiver (e.g., the receiver 70 of FIG. 2) instantly (e.g., without waiting for the receiver to request such virtual beacons). The server 102 can also send the virtual beacon files stored in the store 104 to a remote receiver when the receiver requests such files. Any file transfer method known in the art can be used.

The web server 103 is used to delivery the virtual beacon files stored in the store 104 to a remote receiver (e.g., the receiver 70 of FIG. 2) when the receiver requests such files (e.g., on-demand delivery). The web server 103 also includes a web address so that external systems can access the web server 103 for the virtual beacon files stored in the store 104. The web server 103 can be implemented using known technology.

During operation, the gateway 101 receives external location-based virtual beacon files (e.g., the electronic file 92 of FIG. 5) from external virtual beacon creators (e.g., the creator 50 of FIG. 2). The gateway 101 then sends the file to the virtual beacon store 104 where the file is stored.

When the gateway 101 receives a request from an external receiver (e.g., receiver 70 of FIG. 2) for virtual beacon files with positional data indicating positions that are in the vicinity of the position of the requesting receiver, the gateway 101 will cause the email server 102, the web server 103, or the file server 104 to reply. Which one of the servers 102-103 should be engaged to reply depends on the request. If the request is an email request, then the email server 102 is engaged. If the request is a web request, the web server 103 is used. If the request is a file request, the file server 104 is used.

In addition, the email server 102 is also used to perform the instant delivery service of the virtual beacon files. In this case, the email server 102 needs to know the recipient's email address (e.g., subscription). In this case, as soon as the gateway 101 receives a new file for a new virtual beacon, the email server 102 checks to see if it needs to send the newly created virtual beacon to one or more of its existing subscribers.

Figure 8A:
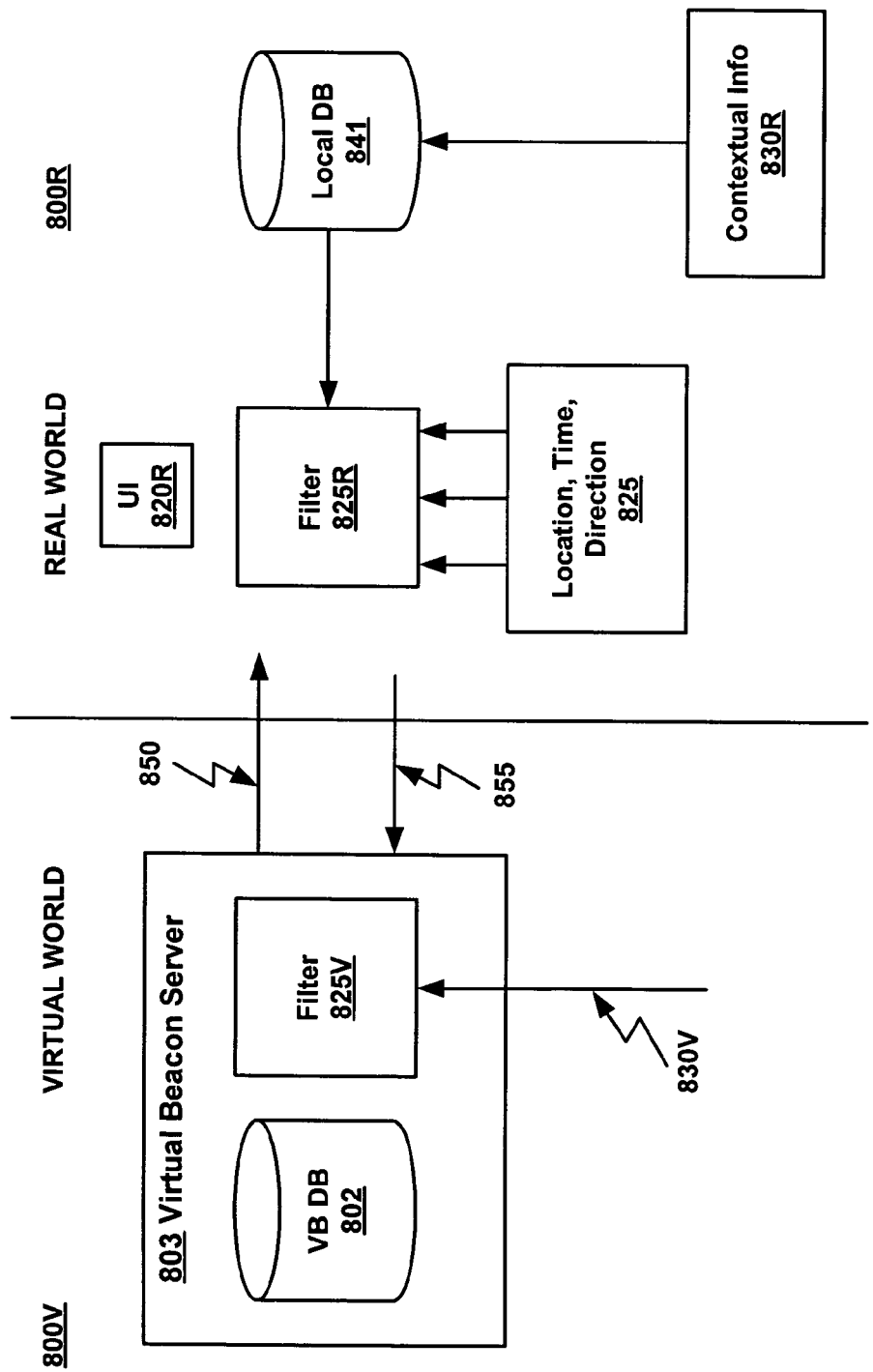
FIG. 8A depicts deployment of an embodiment of the present invention between a virtual milieu and a real milieu.
Figure 8B:
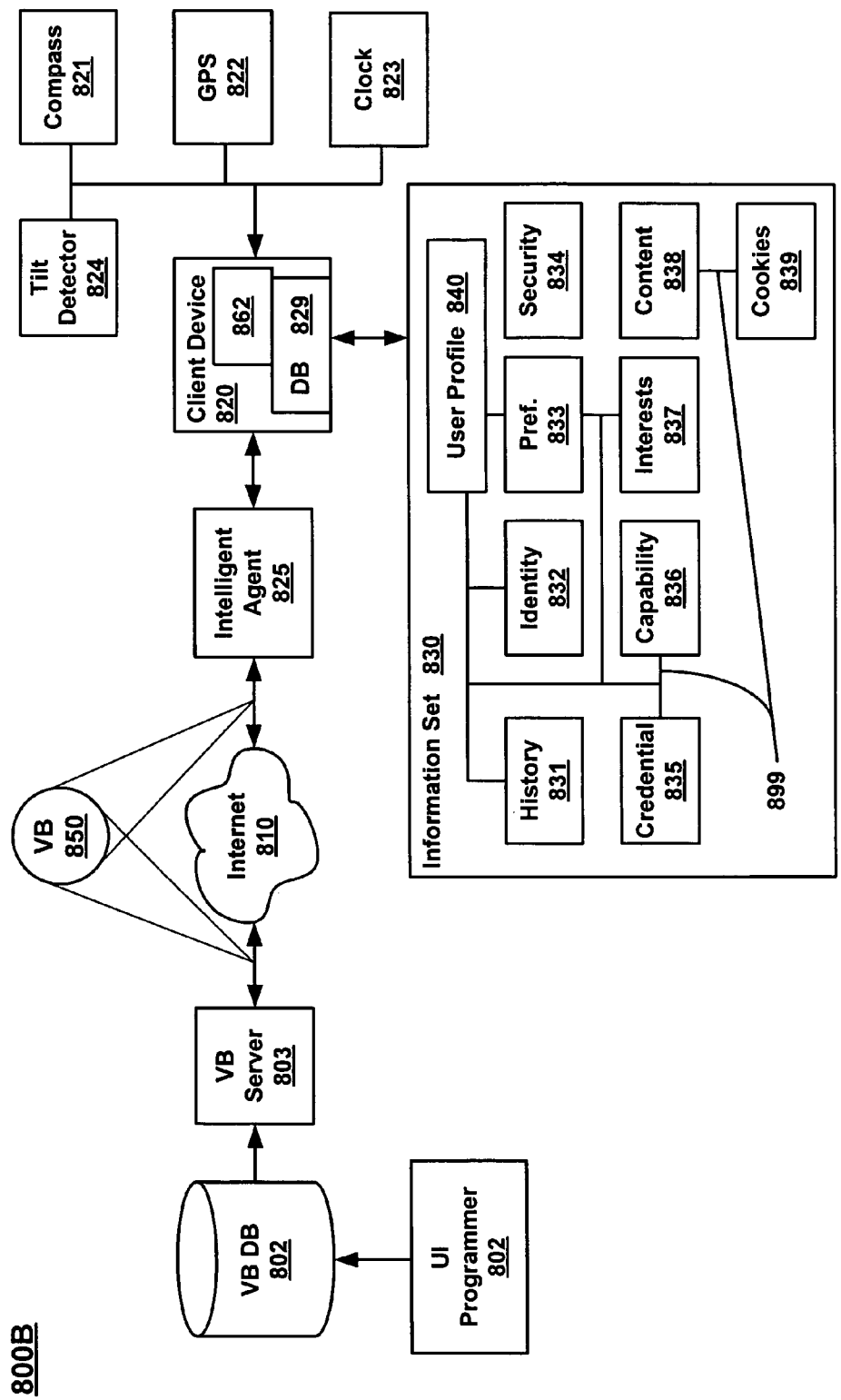
FIG. 8B depicts a network with a mobile computing device and peripheral and a virtual beacon database, according to an embodiment of the present invention.

The filtering module 105 is used to filter out the virtual beacon files that are not supposed to be sent out. The filtering module 105 does this by using the access range of the requesting receiver and the projection range (or access range) of a virtual beacon to determine if the virtual beacon file needs to be transferred. For example, if a virtual beacon file specifies an access range (e.g., a projection range) of 300 yards while the request from the requesting receiver (e.g., the receiver 70; client device 820; FIG. 8B) specifies a range of twenty miles as an area of interest, and if the virtual beacon specifies a location that is within twenty miles and 300 yards from the current position or location of the requesting receiver, then the virtual beacon file will be transferred to the requesting receiver without being filtering out by the filtering module 105. The filtering module 105 may also implement different filtering schemes. Alternatively, the server 60 does not include this module. Filtering module 105 may also be deployed upon the client (e.g., user) device.

Referring back to FIG. 1, the virtual beacon receiver 70 is employed to receive the virtual beacons (e.g., the virtual beacon 91 of FIG. 4) from the server 60. The receiver 70 is a portable or mobile electronic device with wireless (and/or wired) Internet access functionality. In one embodiment, the receiver 70 is a Personal Digital Assistant (PDA), or a personal organize. In another embodiment, the receiver 70 is a palm-top computer or a mobile computer. Alternatively, the receiver 70 can be any kind of information appliance, or any kind of small portable handheld electronic device or appliance which has limited processing, storage, and display resources (e.g., a watch, a cellular phone, or a pager). The computational element 99 in the user device 70 can be a separate computing element or an element embedded within a computation array such as a field programmable gate array (FPGA).

The operation of the virtual beacon receiver 70 is as follows. When the virtual beacon receiver 70 (e.g., client device 820; FIG. 8B) is at a particular physical location (e.g., a bank, a convention center, a bus stop, or simply at a corner of a street in a town, a landmark, historical location, or point of interest, etc., or any other geographical location) and the user thereof acts to have all the virtual beacons located in the area of interest of the receiver 70, the virtual beacon receiver 70 accesses the virtual beacon server 60 via the wireless network 42.

For example, when the virtual beacon receiver 70 is at or near the physical location 45 and wants to know all the virtual beacons in the area of interest of receiver 70, for example, around the current location at which the receiver 70 is located or someplace of interest to the user of receiver 70, the virtual beacon receiver 70 sends a request to the virtual beacon server 60 and receives all the virtual beacon files that contain the positional data indicating positions that are within the area of interest specified by the receiver 70.

The area of interest specified by client receiver device 70 can, but does not have to be, a range surrounding the current location of the receiver device 70. In this way, a user of receiver 70 can take a "virtual tour" of an area of interest around a particular geographical location, via the virtual beacon files available from virtual beacon server 60 corresponding to that area of interest.

The area of interest is specified by the receiver 70 in its request to the virtual beacon server 60. For example, the receiver 70 can specify an area of interest of fifteen miles, twenty miles, or thirty miles, etc. Where the area of interest is set to fifteen miles, any virtual beacon with an access range located within the fifteen mile area of interest of the receiver 70 will be sent from the sender 60 to the receiver 70. Importantly, in one embodiment, this allows a user the ability to pre-cache virtual beacon files locally on board receiver 70 (e.g., client device 820; FIG. 8B) where the access range of the virtual beacons intersects the area of interest specified for the receiver 70.

In one embodiment, server 60 can be aware of the location of receiver 70. However, in another embodiment, server 60 remains aware of the location of receiver 70. Advantageously, the privacy of a user is promoted in one embodiment, because the virtual beacons transferred to the client receiver 70 do not imply a location of the user; rather only an interest in an area. The area of interest and access range will be described in more detail below, in conjunction with FIG. 6.

Figure 7:
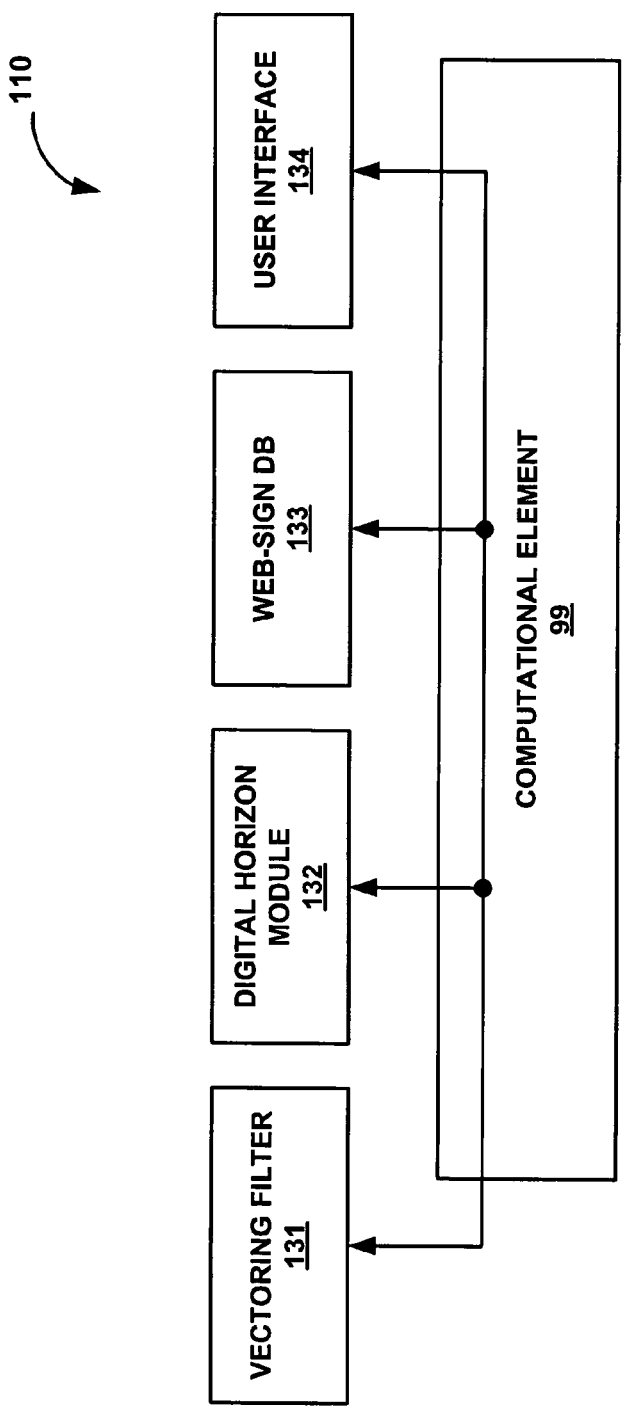
FIG. 7 depicts the structure of the virtual beacon projector of FIG. 7, according to one embodiment of the present invention.

The receiver 70 then displays all the virtual beacons received from the server 60. FIG. 7 shows one example of the displayed virtual beacons of the receiver 70. The virtual beacon files sent from the server 60 to the receiver 70 are in the XML data format in one embodiment. In another embodiment, virtual beacons can comprise another data format. The receiver 70 can also have a local filtering element (e.g., filter 825R; FIG. 8A) to selectively display virtual beacons.

As described above, the wireless network 42 is a wireless Internet network that allows the virtual beacon receiver 70 to communicate with the virtual beacon server 60 using an open standard communication protocol (e.g., HTTP or an email protocol, etc.) or a private protocol. Thus in one embodiment, the communication between the server 60 and the receiver 70 can follow typical Internet, file, or email communication. Thus, server 60 has a web address, file transfer protocol (FTP) address, or email address and the receiver 70 includes a web browsing capability; file transfer capability, and/or email capability. The receiver 70 accesses the server 60 using a web browser and the web address of the server 60. If email is used for the communication, the receiver 70 accesses the server 60 using its email software and the email address of the server 60.

The receiver 70 accesses the server 60 with a request (not shown). In the request, the receiver 70 specifies an area of interest. The area of interest can be for instance the current position of receiver 70 or a location the user of receiver 70 desires to explore by virtual tour. In the present embodiment, positional data of the area of interest (e.g., current position; etc.) of the receiver 70 is included in the request. Positional location can also be transferred as a relative location or position.

In addition, the receiver 70 also specifies, in the request, the virtual access range of the virtual beacons to be received. This effectively limits the range or distance that the receiver 70 can receive a location-based virtual beacon file. For instance, if a virtual beacon file specifies an access range that is beyond the specified area of interest of receiver 70, such as from the current location of the receiver 70, the receiver 70 will not receive that virtual beacon file from the server 60. If however the virtual beacon file specifies an access range that is within the specified area of interest of the receiver 70, such as from the current location of the receiver 70, the receiver 70 will receive that virtual beacon file from the server 60. In one embodiment, this characterizes one default operating mode.

Alternatively, the request does not specify the virtual access range of the virtual beacons to be received. In this case, the access range data is stored in the receiver 70 and the filtering process takes place within the receiver 70 before the receiver 70 displays the received virtual beacon files.

The concept of access range is introduced to limit the display (e.g., visualization) of data. Access range may also tend to economize on traffic between the server 60 and the receiver 70 along the network 42. As is known, physical beacons have physical constraints, which can effectively limit access range. While a system where users are not limited by the physical constraints is desirable, some constraints can still be useful. For example, without any restraint, a system could cause users to see a very large number of virtual beacons, which could have unwanted effects such as cognitive confusion and beacon display overload.

In the web navigation system 40, a virtual beacon is a virtual entity; thus a virtual access range constraint is desirable. Users can experience the virtual beacons only within their respective digital horizons. As used herein, a digital horizon is a set of all the virtual beacons that are "activated" as a result of the user being in their range. While range is the property of an individual virtual beacon, the digital horizon is the temporal and spatial property of an individual user.

Figure 6A:
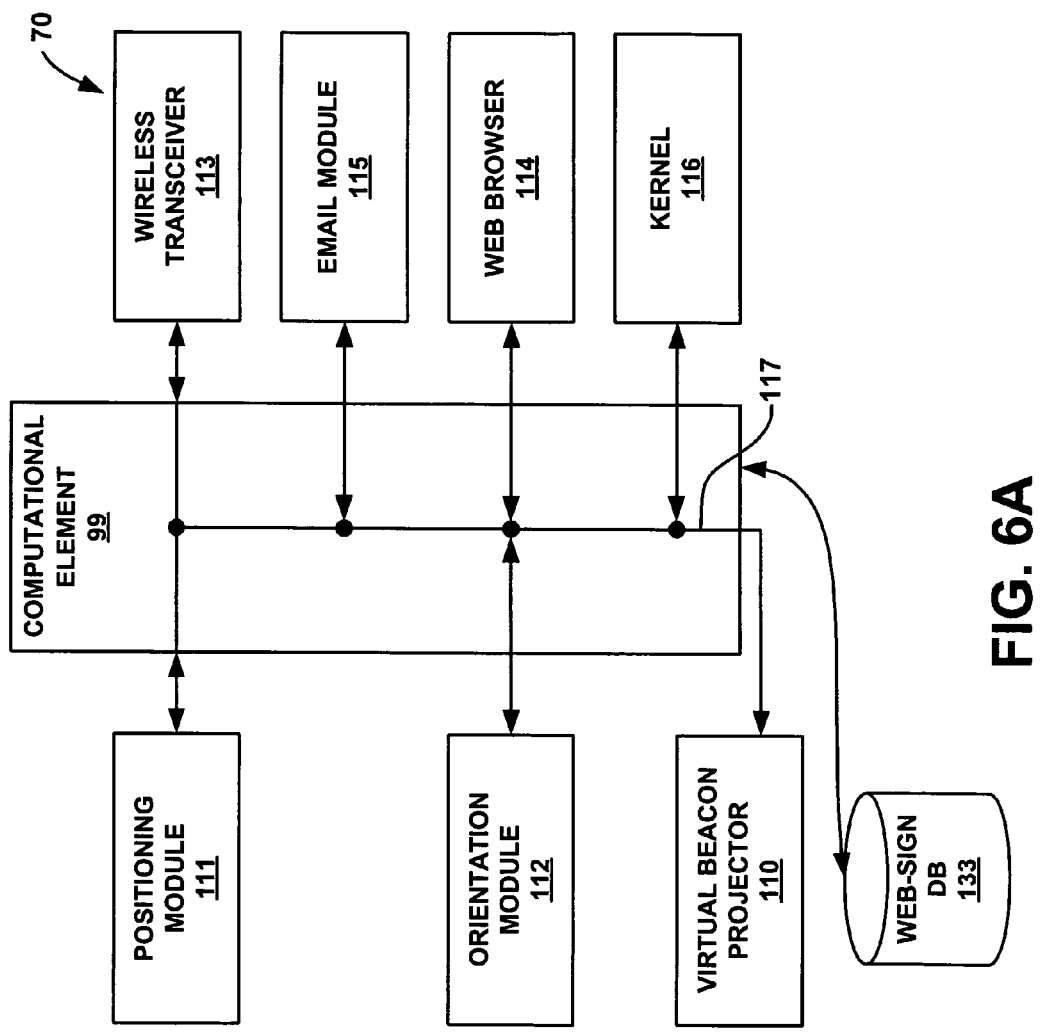
FIG. 6A shows the structure of the virtual beacon receiver of FIG. 1, according to one embodiment of the present invention.

FIG. 6A shows the structure of the virtual beacon receiver 70 depicted in FIG. 1. FIG. 6A shows that receiver 70 includes a positioning module 111, an orientation module 112, a wireless transceiver 113, a web browser 114, an email (and/or e.g., a file transfer) module 115, a kernel 116, and a virtual beacon projector 110. These modules are connected together via an internal bus 117.

The positioning module 111 provides the positional data of the current position of the receiver 70. In one embodiment, the positioning module 111 is a GPS receiver module. Alternatively, the positioning module 111 can be implemented using other known technology. Positioning can also comprise relative positioning and reference a local coordinate system.

The orientation module 112 determines the orientation of the receiver 70. This means that the orientation module 112 determines the direction or orientation the receiver 70 is currently facing. In one embodiment, the orientation module comprises a magnetic compass and/or an inclinometer. Inertial reference systems, accelerometers, and/or gyrocompasses can also be used.

The wireless transceiver 113 is used to send requests for virtual beacons to the remote server 60 (FIG. 1) and to receive virtual beacon electronic files from the server 60 via the network 42 (FIG. 1). The transceiver 113 can be implemented using any known communication technology and is network-specific. Thus the transceiver 113 will not be described in more detail.

The web browser 114 is used to generate the request and to use the request to access the remote server 60. In other words, the web browser 114 is used to control communication between the server 60 and the receiver 70. The web browser 114 can also be implemented using known technology. Like the web browser 114, the email module 115 is used to generate the request in email format and to use the request to access the remote server 60. The email module 115 can also be implemented using known technology.

The kernel 116 is used to communicate and control power management and other features of the hardware of the receiver 70. It also acts as an interface, abstracting the hardware from the other components. This is important as different hardware configuration could be used for different application. The other important functionality of the kernel 116 includes keeping the onboard cache refreshed. On the users demand, the kernel 116 queries the positioning module 111 for the current location, ambiguates it by truncating the trailing digits, and uses the data to queries the server 60 (FIG. 1). The response is stored in the internal database 133, associated with the virtual beacon projector 110.

Figure 6B:
FIG. 6B depicts an exemplary display of a virtual beacon, according to one embodiment of the present invention.

The main function of the projector 110 is to display the received virtual beacon files. FIG. 6B shows one example of the display. Each virtual beacon is displayed with the location information with respect to the current location of the receiver 70. The structure of the projector 110 is shown in FIG. 7, which will be described in more detail below.

Referring to FIG. 7, the virtual beacon projector 110 includes a vectoring filter 131, a digital horizon module 132, a database 133, and a user interface 134. The user interface 134 is employed to allow the user of the receiver to communicate with the projector 110. For example, when the projector 110 displays a number of virtual beacons such as those shown in FIG. 8 and the user wants to access the web page of one of them, the user can do so by clicking on one of the listed hyperlinks. The user interface 134 also includes a display (not shown in FIG. 7). The user interface 134 can be implemented using known technology and will not be described in more detail below.

The digital horizon module 132 is used to restrict the virtual access range of the receiver 70 (FIGS. 1 and 6A). This limits the range or distance that the receiver 70 can receive a location-based virtual beacon file. As described above, the user should only be able to experience the virtual beacons in his digital horizon. We define a digital horizon as a set of all the virtual beacons that are "activated" as a result of the user being in their range. While range is the property of an individual virtual beacon, the digital horizon is the temporal and spatial property of an individual user. Thus, the range data is stored in the buffer 133 and the filtering process takes place within the receiver 70 before the receiver 70 displays the received virtual beacon files. Alternatively, the digital horizon module 132 is not included in the projector 110 and the filtering process takes place in the server 60 (FIG. 1).

The vectoring filter 131 is used to filter the virtual beacons that are in the direction pointed by the receiver 70 (FIG. 1, 6A) and display them on the user interface 134. The kernel 116 of FIG. 7, in response to changes in the magnetometer readings of the orientation module 112 of FIG. 6A, invokes the vectoring filter 131.

Section II

An Intelligent Virtual Beacon for Dynamically Providing Information Corresponding to a Point in Three-Dimensional Space FIG. 8A depicts one exemplary deployment of an embodiment of the present invention between a virtual milieu (e.g., virtual world) 800V and a real milieu (e.g., real world) 800R from the standpoint of a user grounded within the real world 800R. In the present embodiment, a virtual beacon server 803 (which can embody the virtual beacon server 60 discussed in Section I above) comprises a virtual beacon database 802 and a filter 825V. Alternatively, in another embodiment, virtual beacon database 802 and filter 825V can be separate from the server 803, yet coupled thereto.

Server 803 receives location, time, direction, and related information (e.g., tilt) 855 about the user from the real world 800R. Through filter 825V, server 803 further receives contextual information 830V from the real world concerning the user. Contextual information 830V comprises, in one embodiment, information corresponding to contextual information 830R, which the user adds (or allows to be added) to a local (e.g., residing within real world 800R) database 841. However, the contextual information 830V received by filter 825V effectively comprises a version of contextual information 830R, which is sanitized (e.g., edited) to promote (e.g., safeguard, protect, etc.) the privacy of the user. In response to the information 855 and the context 830V, server 103 provides a virtual beacon 850 to real world 800R.

Information 825, which includes the location of the user as well as the corresponding time and direction, etc. are supplied to a filter 825R. Filters 825V and 825R can comprise an intelligent agent (e.g., intelligent agent 825; FIG. 8B). Such an intelligent agent can be deployed in either real world 800R, virtual world 800V, or both. Filter 825R receives contextual information 830R from local database 841. The user can interact with filter 825R, such as to control privacy settings or otherwise control filter 825R, via a user interface 820R. In one embodiment, the information 855 and sanitized contextual information 830R are supplied to virtual beacon server 803 by filter 825R. In one embodiment, virtual world 800V and real world 800R can be linked by a network (e.g., network 800; FIG. 8B). The agent can be deployed on a user device (e.g., device 820; FIG. 8B) or on a remote server. Filter 825R, local database 841, and user interface 820R can comprise components of a remote computing element.

FIG. 8B depicts a network 800 with a mobile computing device 820 (e.g., receiver 70; FIG. 1) and a virtual beacon database 802, according to an embodiment of the present invention. Virtual beacon database 802 functions as a repository of virtual beacons, which are programmed by a user interface (UI) 801. Virtual beacon server 803 connects virtual beacon database 802 to the Internet 810, such that the virtual beacons can be sent to serve intelligently. Any number of virtual beacon databases may be connected to the Internet 810 by virtual beacon server 803. Each virtual beacon database has its own UI 801 for programming. Any number of virtual beacon servers 803 may also comprise the server side of network 800. A virtual beacon 850 provided by virtual beacon server 803 functions by correlating a point in three-dimensional space with an associated URL. This virtual beacon 850 can be used in conjunction with device 820, enabled to detect the beacon.

In the present embodiment, the virtual world 800V of FIG. 8A are represented by the components of network 800 on the Server 803 side of Internet 810. Correspondingly, in the present embodiment, the real world 800R of FIG. 8A are represented by the components of network 800 on the client device 820 side of Internet 810. The function of filters 825R and 825V of FIG. 8B are performed in the present embodiment by an intelligent agent 825, which is depicted in FIG. 8B on the client device 820 side, but can be on either or both sides of Internet 810.

Upon creation by UI programmer 801, virtual beacon 850 is programmed to correlate a point in three-dimensional space, such as a geographic location or an entity located at that location, with an associated URL virtual beacon 850 is then stored within virtual beacon database 802 in a form wherein the URL is mapped to the location.

Client device 820 connects to the Internet 810 by a wireless or other connection modality. Client device 820 is a portable or mobile computing or telecommunications device, such as a personal digital assistant (PDA), cell phone, or the like. Client device 820 contains a computing element 862, which can be a stand alone processor or be embedded in a programmable array of logic such as an FPGA.

Client device 820 has the ability to determine the direction (and e.g., angle) in which it is being pointed. In one embodiment, this ability is conferred by an electronic compass 821 connected to or integrated within client device 820. Client device 820 also has the ability to determine its own location, e.g., geographical position in terms of latitude, longitude, and elevation and/or a relative position. In one embodiment, this ability is conferred by a GPS device 822 connected to or integrated within client device 820.

Client device 820 is aware of the time by means of a clock 823. Client device 820 is informed of its inclination from or declination towards the ground plane of the user by a tilt detector 824. Client device 820 has a database 829, in one embodiment.

Client device 820 can provide, in one embodiment, its location to network 800 such that components of the network such as virtual beacon server 803 and intelligent agent 825 can be aware of the location of client device 820. In another embodiment, importantly, the network components remain unaware of the location of client device 820, advantageously helping to protect the privacy of a user of device 820. In the present embodiment, the client device 820 specifies to the network an area of interest, which can, but does not have to, correspond to the current location of the device 820.

Client device 820 can be loaded with information comprising a set 830 (e.g., to database 829). Information set 830 is loaded on client device 820 by its user. This allows users to decide how much or how little information to load, thus providing the users with the capability of selecting their own degree of privacy with information sharing. The information comprising set 830 can provide context and other information about the user by which server 803 makes virtual beacon 850 selectively available to the user of client device 820.

Information set 830 can comprise subsets including historical data 831, identity 832, preferences 833, security (e.g., security settings) 834, credentials 835, user capabilities 836, user interests 837, content 838, and cookies 840. Client device 820 selectively provides this information to network 800; thus components of the network such as virtual beacon server 803 and intelligent agent 825 can be aware of the information pertinent to client device 820 and its user. Client device 820 can be instructed to provide information such to network 800 automatically or by user action. Further, client device 820 can send user requests to network 800; thus components of the network such as virtual beacon server 803 and intelligent agent 825 can be aware of the information the user of client device 820 is seeking.

Information subsets within information set 830 can share relationships 899 with other information subsets. For instance, a user's credentials 835 and capabilities 836 may be related, as can the user's preferences 833 and interests 837. Content 838 can be associated with cookies 839. Any of the characteristics subsets comprising information set 830 may be combined in any manner, wherein relationships 899 can include complex sequential and non-sequential relationships.

From individual subsets as well as their various relationships 899, a user profile 840 can be configured. User profile 840 can comprise a variety of information about a user of client device 820. Such information can include physical information about the user, interests, previously acquired information or credentials, acquired authentication information, attributes of the device 820, and physical accessibility.

Physical information about the user can comprise age, height, weight, gender, and the like. Interests, such as interests 837 of information set 830 can comprise technical and professional interests, personal activities, hobbies, etc. Previously acquired information or credentials can include a level of achievement or competency, cookies, level of education, passed on permissions, and similar information.

Acquired authentication information comprises a password or personal identification number (PIN) and information provided by scanning an authorization credential such as a security access badge, card, or key. Authentication can also be acquired via a physical beacon. Characteristics of client device 820 can also be included in user profile 840 or elsewhere. Such attributes can include the device's authentication, display, and selected input/output (I/O) and other capabilities.

A virtual beacon provided by virtual beacon server 803 functions within network 800 as a virtual beacon that is electronically created and maintained by a computing system on the Web (e.g., Internet) 810. For instance, the virtual beacon can be electronically created and maintained by UI programmer 801. Thus, various characteristics can be conferred upon virtual beacon 850 by UI programmer 801. Such a virtual beacon can thus be provided with attributes, including dynamic ones, that physical beacons could not support. Such characteristics can include, but are not limited to, time sensitivity, directionality, dynamic flexibility, a defined area of coverage, a dynamic area of coverage (where the virtual beacon has such dynamic flexibility), mobility (e.g., the ability for the virtual beacon to move), sequentiality, and the ability to dynamically vary accessibility based on external criteria.

The dynamically flexible accessibility of a virtual beacon deployed within network 800 can be based on external criteria that include, but are not limited to, user criteria, user profile information, user interests, user capabilities, user security, and user ownership of particular content, credentials, and/or cookies. Any of these criteria may be combined in any manner so as to include complex sequential and non-sequential relationships. Thus, the dynamically flexible accessibility can be made sensitive to, or in one embodiment partially or wholly dependent upon the information loaded into a particular client device 820, including information set 830.

Virtual beacon 850 correlates a point in three-dimensional space with an associated URL. Time sensitivity confers upon virtual beacon 850 the capability of comprising an intelligent, dynamic virtual beacon in four-dimensional space linked to a corresponding URL. With virtual beacon 850 configured with time sensitivity, client device 820 will only detect the beacon during a specific set time interval. For instance, a virtual beacon 850 associated with a particular store is only detectable by a user's device 820 during the time interval during which the store is open.

Conferred with the characteristic of directionality, virtual beacon 850 is detectable by client device 820 only when the device has or is deployed in a particular angular or directional aspect with respect to the point in three dimensional space corresponding to the virtual beacon. Continuing with the previous example, a virtual beacon 850 associated with a particular store is only detectable (e.g., receivable) by a user's device 820 only when the user is at an accessible part of the store, such as the storefront or another authorized access thereto.

Dynamic flexibility is conferred upon virtual beacon 850 by UI programmer 801. Thus, if time sensitivity, directionality, or other characteristics must be changed, virtual beacon 850 may simply be reset with the new time, directionality, or other characteristics. Continuing with the previous example of a virtual beacon 850 associated with a particular store, the store's operating hours may change, such as a seasonal adjustment wherein the store is open later in summer to take advantage of longer daylight hours. In this event, the time interval that the virtual beacon 850 is detectable by a device 820 is simply reset by UI programmer 801 to reflect the new store hours. The store may make open unused door or construct another on the side of the store. In this event, the direction from which the virtual beacon 850 is detectable by a device 820 is simply reset by UI programmer 801 to extend to the side housing the new entrance, as well as the storefront.

Area of coverage programming by UI programmer 801 renders virtual beacon 850 detectable by a device 820 only when the area of interest specified by device 820 resides within a defined three-dimensional space. In one embodiment, the access range of the virtual beacon can be set. For example, a certain virtual beacon 850 may be associated with a hotel. However, its area of coverage programming renders the virtual beacon 850 detectable only by devices 820 that are present within a certain large conference hall, such as to guide a conference participant to various exhibits, speaker stations, or the like.

Further, area of coverage programming can be set in one embodiment to correspond with user actions, such as physical actions taken with respect to client device 820. In one embodiment, this programming can be done locally upon device 820. Virtual beacons downloaded to device 820 can be displayed in response to the user actions. Importantly, in one embodiment, this allows a user the ability to pre-cache virtual beacon files locally on board client device 820, such as where the access range of the virtual beacons intersects the area of interest specified by the client device 820. Advantageously, the privacy of a user is promoted in one embodiment, because the virtual beacons transferred to the client device 820 do not imply a location of the user; rather only an interest in an area.

Device 820 can be programmed to display downloaded virtual beacons in response to its inclination and/or declination with respect to the ground plane upon which the user is standing, which can be detected and converted to corresponding data by tilt detector 824. Thus, if a user points the device 820 down (e.g., towards the ground), virtual beacon 850 that has been downloaded thereto is displayed to provide a URL with information about ground transportation, utilities such as rest rooms or other conveniences, or any other information coded to correspond to pointing device 820 downwards. Likewise, if a user points device 820 upwards (e.g., away from the ground), virtual beacon 850 that has been downloaded thereto is displayed to provide a URL with information about air transportation, restaurants, bars, or other service establishments, or any other information coded to correspond to pointing device 820 upwards.

In another embodiment, server 60 can be aware of the location of device 820. The information can similarly be provided by server 803 responsively to the user action. For instance, server 803 can be programmed to be responsive to the inclination and/or declination of device 820 with respect to the ground plane upon which the user is standing, which can be detected and converted to corresponding data by tilt detector 824. Thus, if a user points the device down (e.g., towards the ground), server 803 can responsively send a virtual beacon 850 that provides a URL with information about ground transportation, utilities such as rest rooms or other conveniences, or any other information coded to correspond to pointing device 820 downwards. Likewise, if a user points device 820 upwards (e.g., away from the ground), server 803 can responsively send a virtual beacon 850 that provides a URL with information about air transportation, restaurants, bars, or other service establishments, or any other information coded to correspond to pointing device 820 upwards.

Conferred with the characteristic of mobility (e.g., motion), virtual beacon 850 can move within three-dimensional space. This feature can be useful for an application such as guiding users around and through the particular three-dimensional space through which virtual beacon 850 is moving by varying the region that client device 820 detects it. Thus, a user may be guided through a museum. Further, as users move following the moving beacon 850, they can be provided with information specific to each region of the three-dimensional space to which they are guided by linking with their device 820 to a particular URL corresponding to each region.

Continuing with the previous example of a moving virtual beacon 850 associated with a museum, each URL can describe what is displayed within the corresponding region, such as artifacts, works of art, or the like. Textual beacons can be displayed as well as a graphical views, including graphics of any format (e.g., JPG and MPEG files) and audio files. Upon visiting a certain landmark or point of interest, a user can be guided by a moving virtual beacon 850 to, for example, the next landmark to visit within a historical area. Upon taking in a particular scene or view at one observation point in a scenic or historically or otherwise significant area, a user can be guided using a device 820 to the next observation point, or to the direction of the next view from the one they are at. Further, a virtual beacon 850 conferred with motion can effectuate a virtual game based on a user finding the virtual beacon using their device 820.

Where a virtual beacon 850 is conferred with dynamic flexibility, it can further be conferred with a dynamic area of coverage, based upon another parameter such as time and/or criteria corresponding to information set 830 such as identity, interests, etc. Where the area of coverage of virtual beacon 850 changes based upon time, a device sensitive to the beacon can guide its users to the place they are to be at a certain time. An event can comprise more than one stage, each stage held or occurring in a different location. Users attending the event can be guided to the right place at the right time using their beacon-sensitive devices 820, by means of the virtual beacon 850.

A wedding exemplifies such an event. The wedding's ceremony may be held in a certain church, to which ceremony invitees are guided by virtual beacon 850. Upon completion of the ceremony, the wedding party moves from the church to a certain reception hall, to which reception invitees are guided by the same virtual beacon 850, conferred with a dynamic area of coverage. If an invitee to both the ceremony and the reception shows up at the church late, e.g., after the wedding party has departed the church to the reception hall, the virtual beacon 850, conferred with a dynamic area of coverage, can link the user to two associated URLs, one which provides a link to a map to the reception hall, and another for example, providing information about the church, perhaps historically interesting information; perhaps religious information, times of services, and the like. Even this latter information can be rendered with temporal significance in one embodiment. For instance, if it is temporally close to the winter holiday season, graphical information such as a JPEG file of the church can be sent depicting the church set in a snowy background, perhaps garlanded & wreathed. If temporally it is spring, summer, or autumn however, the church can be shown with seasonally or other temporally significant graphics.

In one embodiment, a virtual beacon 850 can be downloaded at any time. However, based on context (and other facets gleaned from information set 830), the virtual beacon may only be accessed (e.g., receivable and displayable by) by device 820 at a certain time prescribed by the context. In one embodiment, this access restriction is effectuated by intelligent agent 825, based on context information (e.g., context 830R; FIG. 8A) used by the intelligent agent.

Besides temporally dynamic, the area of coverage of a virtual beacon 850 can be dynamic based on other criteria. Continuing with the instant wedding example, certain users may be invited to the reception, but perhaps not to the ceremony. Virtual beacon 850 can be programmed for dynamic area of coverage based upon the identities of the wedding invitees. Arriving at the church during the ceremony, the virtual beacon 850, conferred with a dynamic area of coverage, can link the user who is invited only to the reception to the two associated URLs discussed above, for example. One provides a link to a map and directions to the reception hall and the time that the reception is to begin. The other for example provides the information about the church. One user may be a member of the wedding party, such as the "best man." The link received by that user can direct him to a particular door behind the church to dress in the ceremonial attire and attend the rehearsal. Based on context, this link would only be provided to the best man, and would not be provided to anyone else.

Conferred with the characteristic of sequentiality, a certain virtual beacon 850 can be detected only after another (e.g., one or more) defined beacon has been acquired, or other sequential criteria are met. An example of a sequentially dynamic virtual beacon is an event such as a fair at which a virtual beacon is used inside the fairgrounds, such as to identify a particular exhibit, show, or attraction. However, the virtual beacons identifying the exhibit, show, or attraction therein are not detectable by a user device 820 until that device has first acquired a virtual beacon 850 corresponding to admission. Thus, a user must be admitted to the fair before acquiring the virtual beacons therein. Sequentiality allows a user to detect event occurrences in a logical fashion, wherein the event is dependent upon the occurrence of other events. In this case, a user's device 820 can only detect a virtual beacon 850 associated with one event or situation after a particular other event, set of events, sequence of events, or any combination thereof, as programmed by UI programmer 801, has occurred, such as a certain virtual beacon is detectable by a client device only after the client device has received a particular email from the associated location.

For example, a user may only detect a virtual beacon 850 associated with an approaching service plaza within a toll road and within the client device search window, upon passing a certain tollbooth. Another user may only detect a virtual beacon 850 associated with a certain courtesy kiosk after visiting a certain number of stores in a shopping mall. Another example is that of a virtual beacon 850 associated with a ski resort: its associated virtual beacon 850 is only detectable when the resort is open and the road by which it is accessed is clear.

A virtual beacon 850 can also be conferred with a characteristic corresponding to the physical accessibility to the point in three-dimensional space corresponding to the beacon, to a particular user. For instance, a certain virtual beacon may be associated with a filling station wherein the station is proximate to but not accessible from a toll road. Thus, the device 820 of user driving on the toll road would not be able to see (e.g., display) the virtual beacon associated with the inaccessible filling station, although the user may be passing quite close to the station. As the access range of the virtual beacon is within the area of interest specified by the client device, the virtual beacon is received, in one embodiment, however, it is filtered, so as not to be displayed. Although the access range of the virtual beacon intersects with the area of interest specified by the device 820, the virtual beacon is not displayed. Advantageously, the virtual beacon thus does not confuse the user, who cannot presently access the location associated with it.

Likewise, another filling station may be located within a service plaza on the toll road and have its own associated virtual beacon. The virtual beacon associated with the filling station in the toll road service plaza would be detectable by a user's device 820 where the user is approaching the vicinity of the service plaza. However, that virtual beacon would not be detectable by a user who is not on the toll road, despite the fact that they may be quite close by, such as driving on a frontage road adjacent to the toll road, but inaccessible to it.

A virtual beacon 850 can be conferred with the ability to be detected based upon user criteria. For instance, the virtual beacon can be programmed to be detectable based on a particular user criterion, or upon any combination of user criteria, user profile information, and/or characteristics, such as within user profile 840 or information set 830. As discussed above, such criteria can comprise physical information about the user such as age, height, weight, gender, etc., interests 837, previously acquired information or credentials, cookies, education level, passed on permissions, and similar information. Characteristics of client device 820 such as the device's authentication, display, and selected I/O and other capabilities can also comprise such user criteria.

Any of the characteristics discussed above: time, directionality, area of coverage, motion, dynamic area of coverage, sequentiality, physical accessibility, and user criteria, can be combined in any manner including simple and complex sequential and non-sequential relationships to confer corresponding attributes to a virtual beacon 850. For instance, continuing with the toll road and filling station examples above, a physical accessibility attribute of a virtual beacon 850 may comprise a user having engaged in a sequence of first paying a toll and then driving within the area of coverage of the toll road service plaza filling station before the virtual beacon 850 associated with the toll road service plaza filling station becomes detectable by the user's device 820. Further, the virtual beacon 850 may only be detectable during hours the filling station is open. Through programming with these characteristics and their various combinations, virtual beacons can acquire a significant degree of intelligence of operation.

An intelligent agent 825 can be associated with a collection of virtual beacons 850 and can be deployed on either the virtual beacon server 803 side or the client 820 side of Internet 810. The intelligent agent 825 can detect that a certain client device 820 is accessing virtual beacons 850 associated with groups of locations (e.g., points in three-dimensional space), attempt to ascertain a correlation between the members of this group of locations, and responsively enable other virtual beacons 850 that it infers may be of interest to the user of client device 820, and that fall within the client's search window, as described above in Section I. Further, users of a client device 820 can utilize intelligent agent 825 to have a group of associated locations correlated by the users, themselves activate their associated virtual beacons 850 in response to a request transmitted by their device 820.

Where intelligent agent 825 must sort through non-indexed and other data, time is saved and computational resources are used efficiently in one embodiment by offloading such sorts to a co-processing module, which can be implemented using a configurable logic array such as a PGA, or by other means.

For instance, an intelligent agent 825 associated with a collection of virtual beacons 850 can detect that a user is accessing certain of the virtual beacons 850 belonging to the group, such as that a user is visiting all or some of the major wineries in a particular area. Upon detecting this, intelligent agent 825 can enable (e.g., activate) virtual beacons 850 associated with smaller and/or less known wineries in that area (e.g., that fall within the client's search window, as described above in Section I). A user can utilize the intelligent agent 825 to request activation of all virtual beacons within the client's search window that match a certain criterion or group of criteria, such as a particular purchase criterion. For example, the user requests the intelligent agent 825 to activate the virtual beacons 850 associated with all open stores within the search window that have a particular product currently available. Criteria can be added; for instance, request the intelligent agent 825 to activate the virtual beacons 850 associated with all open stores within the search window that have a particular product currently available, on sale, or below a certain price.

The dynamic and intelligent character of virtual beacons 850 allow the provision of timely and useful information, without superfluousness, to users of enabled devices 820. Correlations of events are thus enabled by network 800. For instance, upon a change in weather, such as an unexpected rainstorm, virtual beacons 850 associated with local shops affected by the weather are enabled to advertise the sale of items useful in that weather milieu, such as umbrellas.

In one embodiment, a virtual beacon expires, e.g., is deactivated upon the occurrence of some associated, pre-programmed condition, such as upon a client device visiting and departing from the actual geographical location to which the virtual beacon is associated, an associated store closes, weather clears, an event is over, etc. This can advantageously save computing and network resources, as well as preventing now superfluous or temporarily erroneous information from presentation to an enabled client device and any possible associated nuisance.

For instance, expiring, e.g., deactivating, a virtual beacon at night for a landmark or attraction that is only open during daylight hours-prevents the virtual beacon from mis-attracting a user of an activated client device to the now-closed place. This feature is also useful for applying virtual beacons as a tour guide or route marker. For example, for a tourist user who only wants to visit a monument, landmark, etc. once, the virtual beacon can expire for that user's client device upon departing from the vicinity of the location.

Virtual beacons 850 can also be made available upon subscription, evinced for example by a credential or cookie placed upon the device 820 in return for paying a subscription fee. Subscription type virtual beacons 850 can provide access to pay-for-view type URLs or other services, tour guide services, such as by using a motion-enabled virtual beacon, premium type services at a location, and other services.

In one embodiment, virtual beacons 850 effectuate virtual tours of a location outside of the user's current location. In such a virtual tour, a user device 820 provides context via intelligent agent 825 corresponding to a desire, interest, whim, or the like to visit another (e.g., remote) location, at some future time for instance. Responsively, virtual beacons 850 corresponding to the location and/or to the prospective time (e.g., season) of the visit are sent to device 820.

Conferred with any of the characteristics discussed above: time, directionality, area of coverage, motion, dynamic area of coverage, sequentiality, physical accessibility, and user criteria, and any simple or complex sequential or non-sequential combination of these characteristics, virtual beacon 850 functions 20, to intelligently dynamically provide information corresponding to a point in three-dimensional space to a user of a device 820 sensitive to the virtual beacon.

Figure 9:
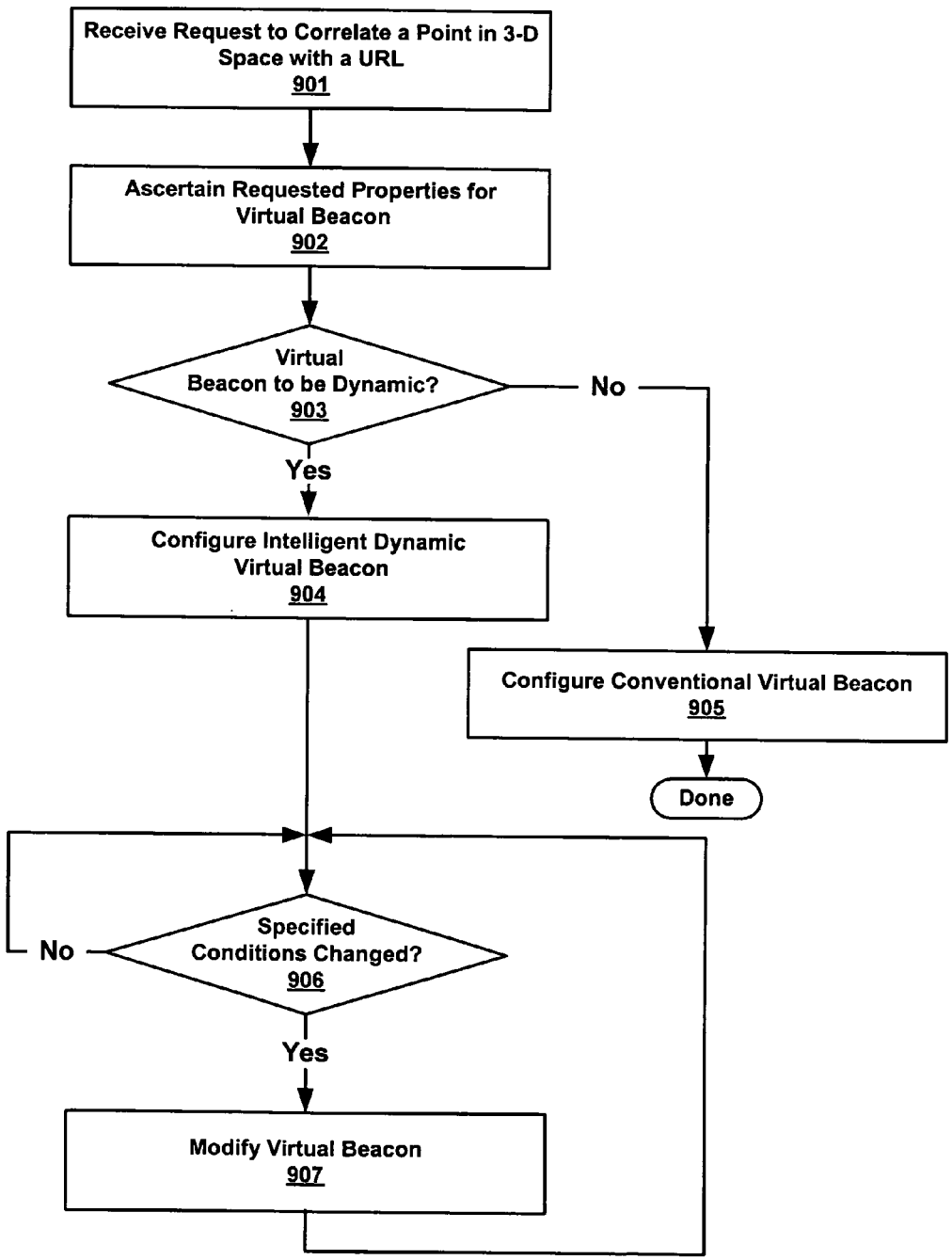
FIG. 9 depicts an exemplary implementation of a method for associating a geographic location with a URL using an intelligent virtual beacon, according to an embodiment of the present invention.

FIG. 9 is a flowchart of a process 900 for programming a virtual beacon. Process 900 begins with a step 901, wherein a request is received to correlate a point in three-dimensional (3-D) space with a certain URL, e.g., to create a virtual beacon for that point with the specified URL.

In step 902, the requested properties for the virtual beacon are ascertained by an entity receiving the request. Such an entity can control a user interface programming tool (e.g., UI programmer 801; FIG. 8) for configuring a virtual beacon.

In step 903, it is determined whether the virtual beacon is to be dynamic. If so, then in step 904, an intelligent and dynamic virtual beacon is configured according to the ascertained requested properties.

The requested intelligent and dynamic properties can include any of the characteristics discussed above; such as time, directionality, area of coverage, motion, dynamic area of coverage, sequentiality, physical accessibility, and user criteria. The requested intelligent and dynamic properties can also include any simple or complex sequential or non-sequential combination of these characteristics, as discussed above.

If it is determined that the virtual beacon is to be a simple static (e.g., non-dynamic) virtual beacon, then in step 905, a static virtual beacon is configured, upon which process 900 can be complete.

In step 906, it is determined whether conditions specified by programming the virtual beacon have changed. If so, then in step 907, the virtual beacon is modified accordingly, such as by re-programming.

For example, for a virtual beacon associated with a point in three-dimensional space corresponding to a certain store, when the scheduled time of day at which the store closes is reached, the virtual beacon is deactivated. The next day, when the scheduled time of day at which the store opens is reached, the virtual beacon is reactivated.

In one embodiment, a virtual beacon expires, e.g., is deactivated upon the occurrence of some associated, pre-programmed condition, such as upon a client device visiting and departing from the actual geographical location to which the virtual beacon is associated. This can advantageously save computing and network resources, as well as preventing now superfluous information from presentation to a client device. A user device (e.g., device 820; FIG. 8B) can also be pre-programmed to look for activation and reactivation of such a virtual beacon.

Upon execution of step 907, or if it is determined in step 906 that the conditions specified by programming the virtual beacon have not changed, then process 900 loops back to repeat step 906.

Exemplary Applications

Figure 10A:
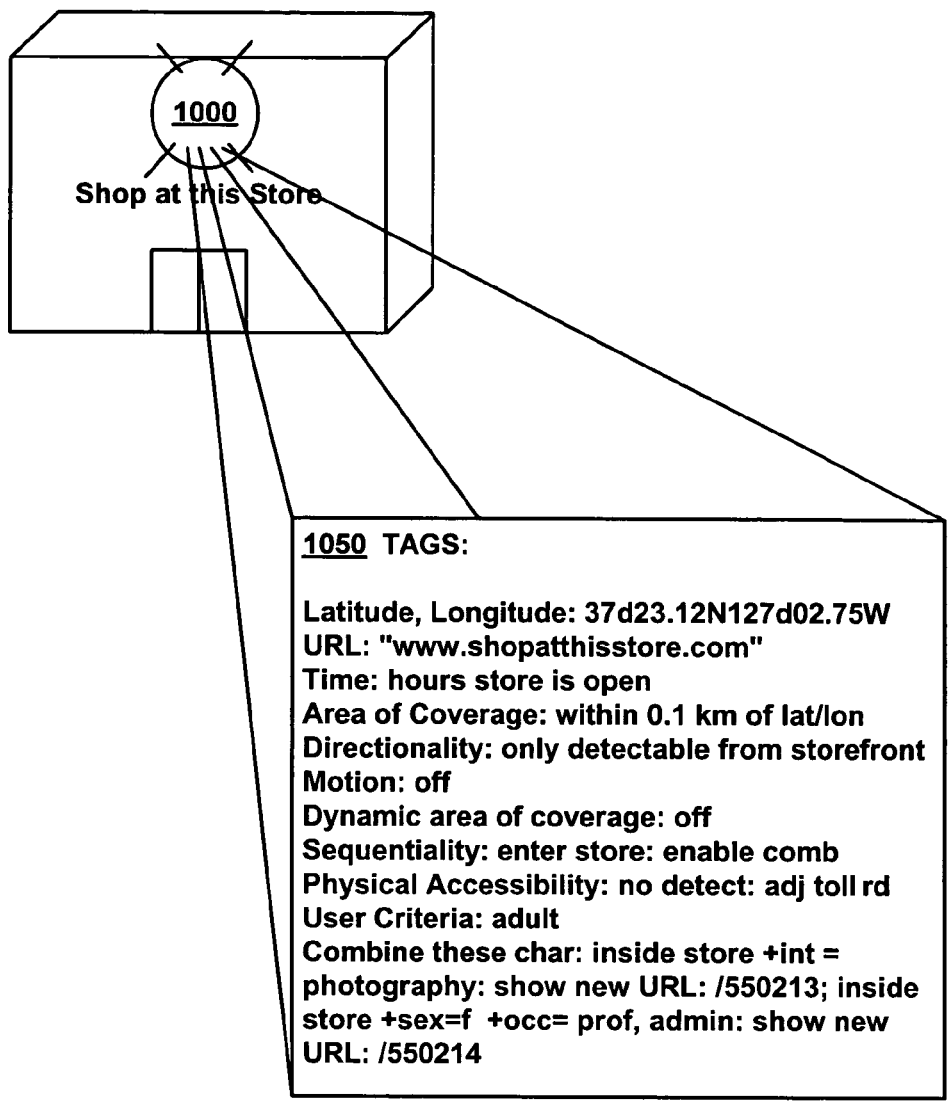
FIGS. 10A-C depict exemplary applications for a virtual beacon for providing information corresponding to a point in three-dimensional space to a client device, according to an embodiment of the present invention.
Figure 10B:
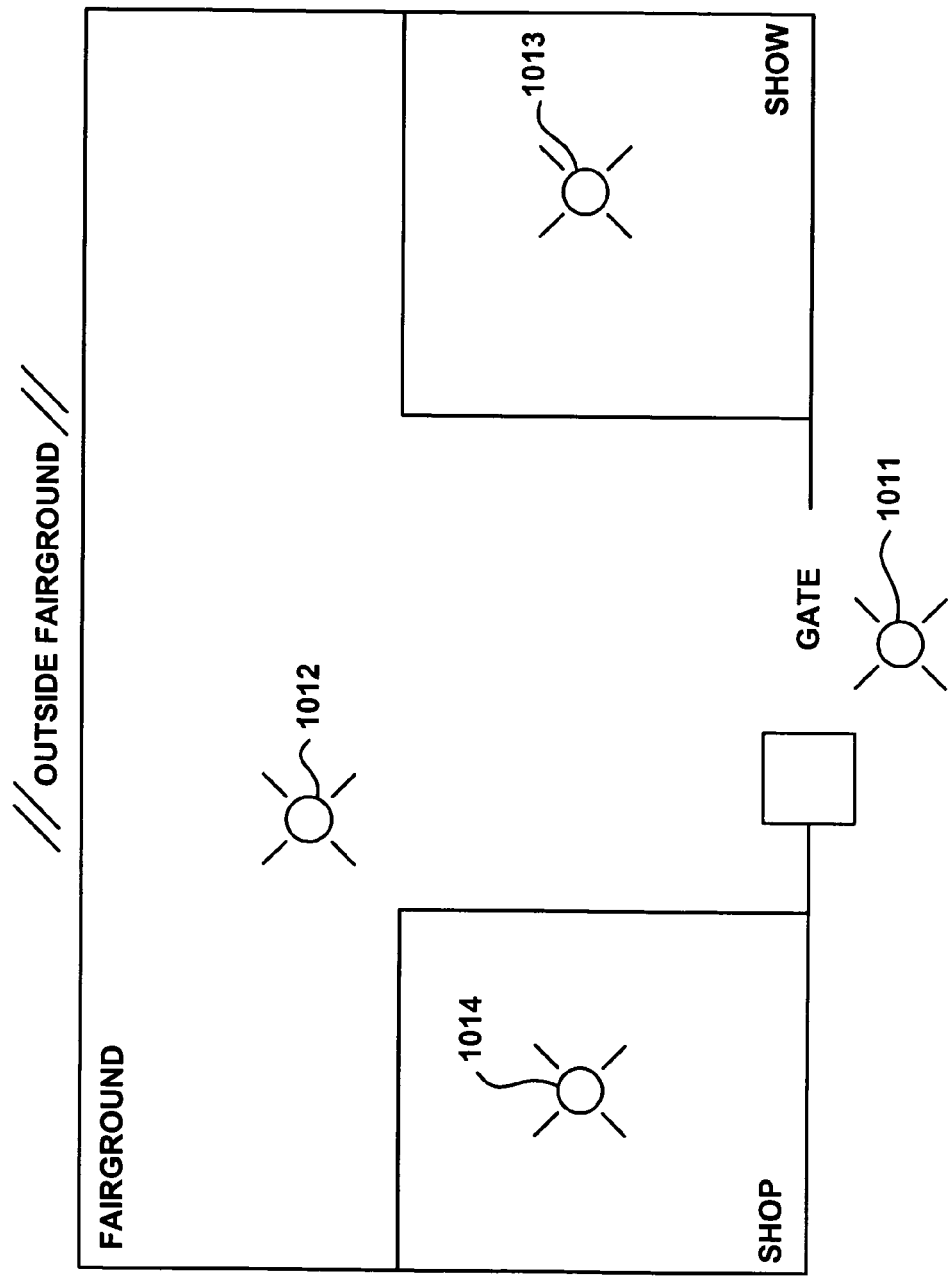
Figure 10C:
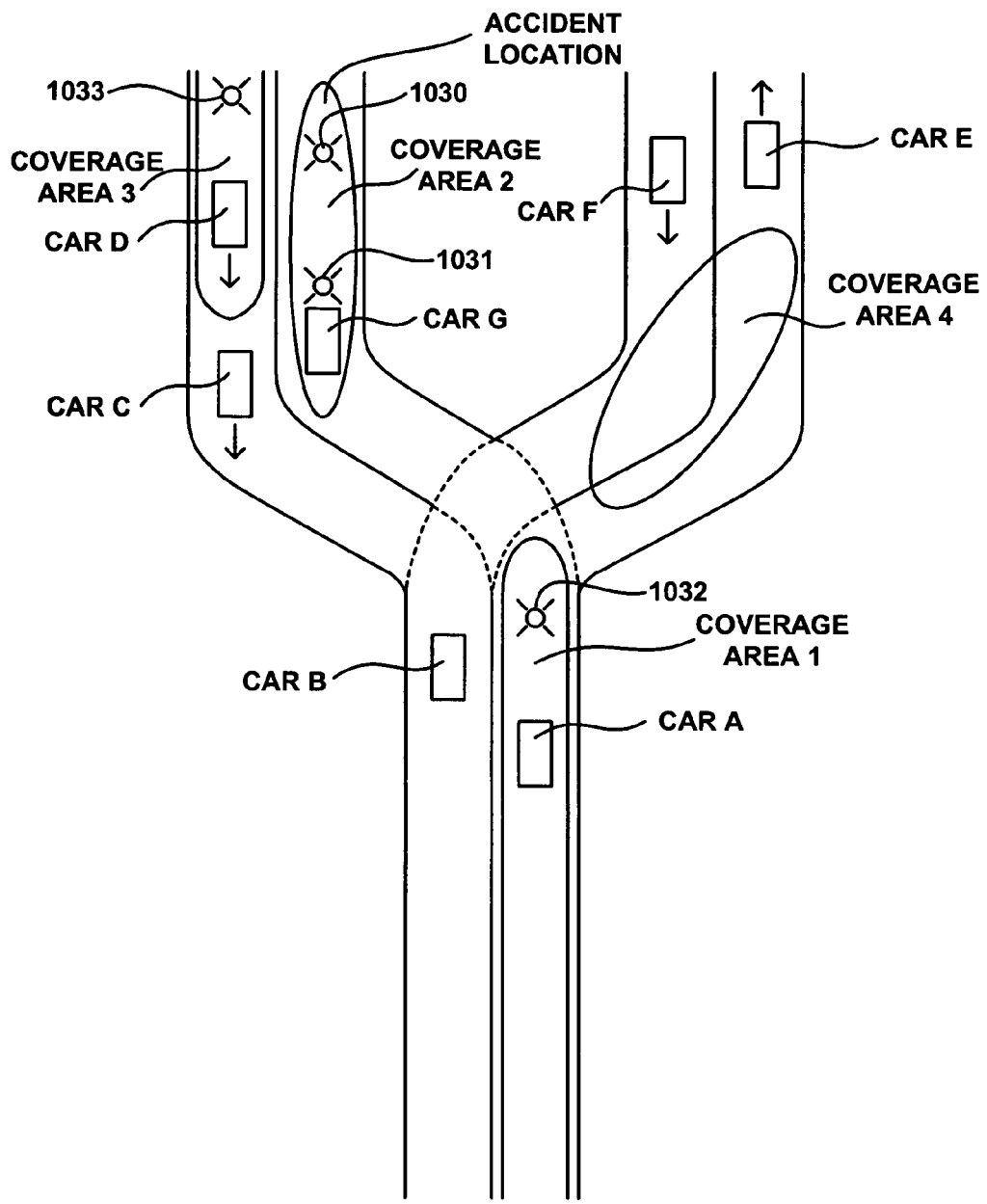

FIGS. 10A, 10B, and 10C depict useful exemplary applications of virtual beacons. FIG. 10A depicts an exemplary "Shop at this Store" store having an associated virtual beacon 1000. Virtual beacon 1000 links the store (e.g., the point in three-dimensional space corresponding to the store's geographical location) to an exemplary corresponding URL, such as "www.shopatthisstore.com". The store's geographical location comprises latitude, longitude, and elevation. Elevation can be given if relevant, or it can be implied from the latitude and longitude, such as by reference to corresponding contour maps. Where given, it can be expressed in elevation with respect to sea level or stated to correspond to a certain floor, such as for a store located in a multi-story building.

Virtual beacon 1000 comprises a set of tags 1050 to include the latitude, longitude (and elevation, if relevant), and the associated URL. The associated URL will be visible (e.g., detectable) by an enabled client device (e.g., device 820; FIG. 8) if the latitude and longitude (e.g., Lat/Lon) fall within the client's search window, as described above in Section I, and the criteria defined by the tags are met. In the present exemplary implementation, the criteria defined by the tags are as follows:

Time: the virtual beacon is only visible during hours the store is open

Area of coverage: the virtual beacon is only visible within one tenth kilometer of the store's Lat/Lon Directionality: the virtual beacon is only visible from the front of the store Sequentiality: entering the store enables combinations of certain criteria Physical Accessibility: the virtual beacon is not visible from an adjacent toll road (e.g., because the store is inaccessible therefrom)

User Criteria: the virtual beacon is only visible to an adult's device

Combine these Characteristics:

inside store +int=photography: show new URL: /550213 (e.g., once the user is inside the store—e.g., sequence—AND the user's interests stored on the user's device—e.g., interests 837 of information set 830; FIG. 8—includes "photography," show a new webpage associated with the store's main URL—e.g.—wherein the new URL states that "cameras are on sale," listing brands, descriptions, accessories, prices, duration of the sale, etc.)

inside store +sex=f+occ=prof, admin: show new URL: /550214 (e.g., once the user is inside the store—e.g., sequence—AND the user's sex—e.g., as stored on the user's device—e.g., identity 832 and/or user profile 840 of information set 830; FIG. 8—AND the user's occupation on the user's device—e.g., user profile 840 of information set 830; FIG. 8—is either "professional" or "administrative," show a new webpage associated with the store's main URL—e.g.—wherein the new URL states that "dresses are on sale," listing brands, descriptions, accessories, prices, duration of the sale, etc.).

Similarly, where a device 820 contains context information, such as that the user thereof has a special interest or hobby, virtual beacons 850 can be provided to the device based upon such context information. For example, if interests 837 (FIG. 8B) includes "fishing," and a user is in the vicinity of a lake, a virtual beacon can provide the user with a pointer directing the user to a website with information regarding what species of fish abound within that lake, what game fish may be sought there at the particular time of the year corresponding to the user's presence, and the like.

FIG. 10B depicts an exemplary fairground with four associated virtual beacons 1011, 1012, 1013, and 1014. Virtual beacon 1011, associated with the point in space corresponding to the fair ground's entrance (e.g., gate), is visible to all enabled client devices if its Lat/Lon tags (e.g., the Lat/Lon of the gate) fall within the client's search window, as described above in Section I, and the fair is open. The URL associated with virtual beacon 1011 can be a webpage with general information pertinent to the fair.

Virtual beacon 1012, associated with a point in space corresponding to an attraction within the fairgrounds, is visible to an enabled client device only if its Lat/Lon tags fall within the client's search window, as described above in Section I, and the fair is open, and the client device is currently within the Lat/Lon boundaries of the fairground. This combination of requisites for receivability imply sequence: the client has entered the fairgrounds. The URL associated with virtual beacon 1012 can be a webpage with more particular information pertinent, e.g. to a specific fair attraction or event or group of attractions and events.

Virtual beacon 1013, associated with a point in space corresponding to a show at a venue within the fairgrounds, is visible to an enabled client device only if its Lat/Lon tags fall within the client's search window, as described above in Section I, and the fair is open, and the client device is currently within the Lat/Lon boundaries of the fairground, and the client has purchased a ticket for the show at the gate (e.g., or prior to arrival). This combination of requisites for receivability implies a more complex sequence than the last example: the client has purchased a ticket, evinced by a cookie or credential placed upon their device (e.g., cookie 839, credential 835, device 820; FIG. 8), and then entered the fairgrounds. The URL associated with virtual beacon 1013 can be a webpage with information pertinent, e.g., to the show and the performers therein.

Virtual beacon 1014, associated with a point in space corresponding to an attraction within the fairgrounds, is visible to an enabled client device only if its Lat/Lon tags fall within the client's search window, as described above in Section I, and the fair is open, and the client device is currently within the Lat/Lon boundaries of the fairground, and the user thereof has earned an electronic coupon after having spent a certain requisite amount on clothing. The URL associated with virtual beacon 1014 can be a webpage with information pertinent to special sales on clothing. In the present implementation, Lat/Lon tags are used to exemplify one possible technique for positional tagging. This is not meant to be limiting however. Embodiments of the present invention are well suited to using other positional information. For instance, in one embodiment, altitude tags are included, as well. Tagging can also be implemented based on relative or other positioning.

FIG. 10C depicts the useful application of virtual beacons having coverage areas along a stretch of roadway (e.g., association with a geographical location corresponding to various parts of the road). In the present example, an accident has occurred within coverage area 2, and a virtual beacon 1030 is generated corresponding to that location and providing information that the accident has occurred, which can alert an emergency response entity.

Traffic such as car G within coverage area 2 receive a virtual beacon 1031 that notifies them, e.g., to slow down and expect delays. Traffic in coverage area 1, such as car A receive a virtual beacon 1032 that suggesting an alternate route, such as heading into coverage area 4, instead of into the impacted coverage area 2. Traffic such as car B in coverage area 3 receive a virtual beacon 1033, advising them to exercise caution and not to "rubberneck." The virtual beacons associated with each different location, in this case regions of the roadway, provide client devices within each region with information dynamically pertinent to that particular region. Such dynamic and intelligent flexibility can be based upon programming the individual IAPs to intelligently respond to particular events that occur in associated, in this case near by regions of the roadway, in particular ways, e.g., by providing particularly timely, pertinent, and time-pertinent information. Used in this fashion, virtual beacon 850 can provide safety information as a public service, without the need for police, transport, road, or other agencies having to erect or place a physical beacon in response to varying roadway and other hazards and other conditions.

Exemplary Data Structure

In one embodiment, a virtual beacon for selectively providing information relating to a point in three-dimensional space based on context relating to a user of a detector of the virtual beacon. The point in three-dimensional space corresponds to a unique geographical location, such as a latitude and a longitude. The information selectively provided can change dynamically in response to a condition described by the context. This condition relates to the dynamic pertinence of information with respect to the context and the receivability of the virtual beacon by the detector is activated and deactivated in response to the condition. This dynamic pertinence can be based on time or locational aspect of the detector.

Such a locational aspect can be directional orientation, tilt orientation, residing within a specified area of coverage, motion through the specified area of coverage, and accessibility of the place occupying the geographic location to the detector's location. The dynamic pertinence can also be based on a sequence of events occurring. For instance, the area of coverage can changes dynamically in response to this sequence of events.

The dynamic pertinence can also be based on an aspect of the context relating to an attribute of the user. For instance, such user characteristics can include identity, profile, history, preferences, credentials, capability, interests, and privacy selections. The context is subject to filtering to deter determining the user's location (except by the user).

Figure 11:
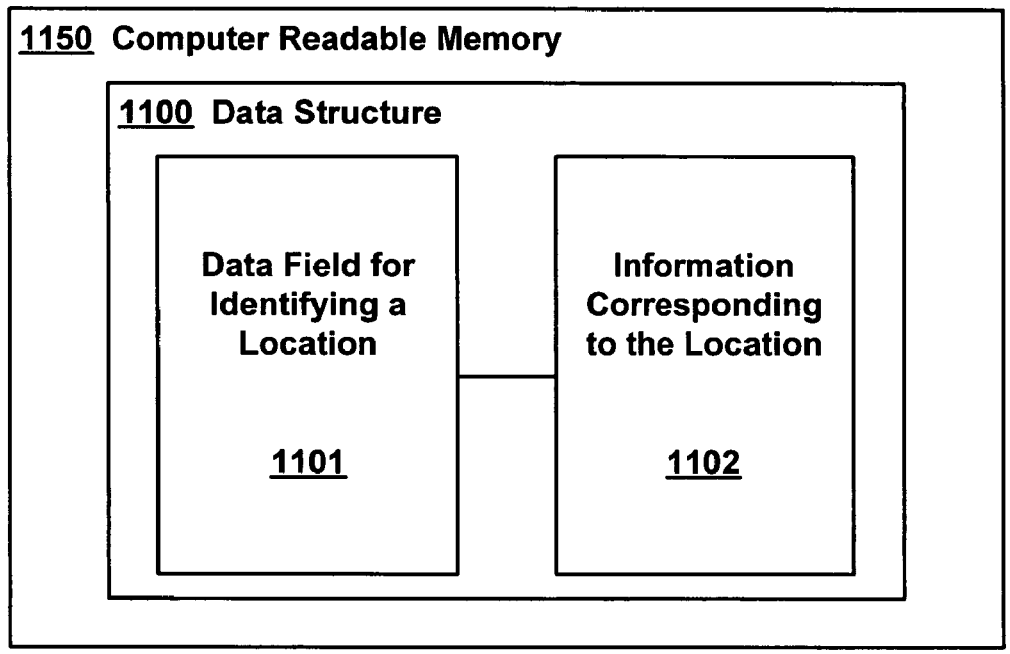
FIG. 11 depicts an exemplary data structure disposed in a computer readable memory, according to an embodiment of the present invention.

FIG. 11 depicts an exemplary data structure 1100 disposed in a computer memory 1150 for providing information corresponding to a location, according to one embodiment of the present invention. In one embodiment, data structure 1100 functions as a virtual beacon (e.g., virtual beacon 850; FIG. 8B). Data structure 1100 comprises a first data field 1101. Data field 1101 functions to identify a location. Data structure 1100 also comprises a second data field 1102. Data field 1102 comprises information corresponding to the location. In one embodiment, data field 1101 comprises a latitude and a longitude. In one embodiment, data field 1102 can a uniform resource locator, a telephone number, an address, or other information.

The information can also comprise a telephone number, address, or other information. For example, where a party of three was to meet at a certain location and two of them meet prior to the arrival of the third, they may depart and leave the third person a telephone number of one of the other two, so that the third person can contact them. Or the address of a destination and/or a time of arrival, etc., can be left. The telephone number, address, etc., can be left on the field 1102 of a data structure 1100 corresponding to the location of the meeting point. The third person can detect the data structure, which can function as a virtual beacon, upon arrival within the vicinity or proximity of the location.

In one embodiment, the information comprising data structure 1100 is selectively provided to a client device on a network based on contextual information relating to a user of the client device. The contextual information is subject to filtering wherein the filtering functions to deter locating the user.

The contextual information changes dynamically in response to a condition relating to the temporal pertinence of the locational information with respect to said contextual information. The receivability of the data structure to the client device is activated and deactivated in response to said condition (e.g., data structure 1100 is made detectable and undetectable, to the client device based on the condition).

The condition comprises a quality such as time or a locational aspect of the client device. The locational aspect comprises a state such as directional orientation, tilt orientation, residing within a specified area of coverage, motion through said specified area of coverage, and accessibility of said location to a position of said client device. The condition comprises a sequence of events occurring wherein the area of coverage changes dynamically in response to the sequence of events.

In one embodiment, the contextual information (e.g., context) comprises an attribute of the user. The attribute can be, for example, identity, profile, history, a preference, a credential, capability, an interest, and a privacy selection. Where said client device comprises a computing device, portable or stationary, the context information can be stored on the device.

Exemplary Process

Figure 12:
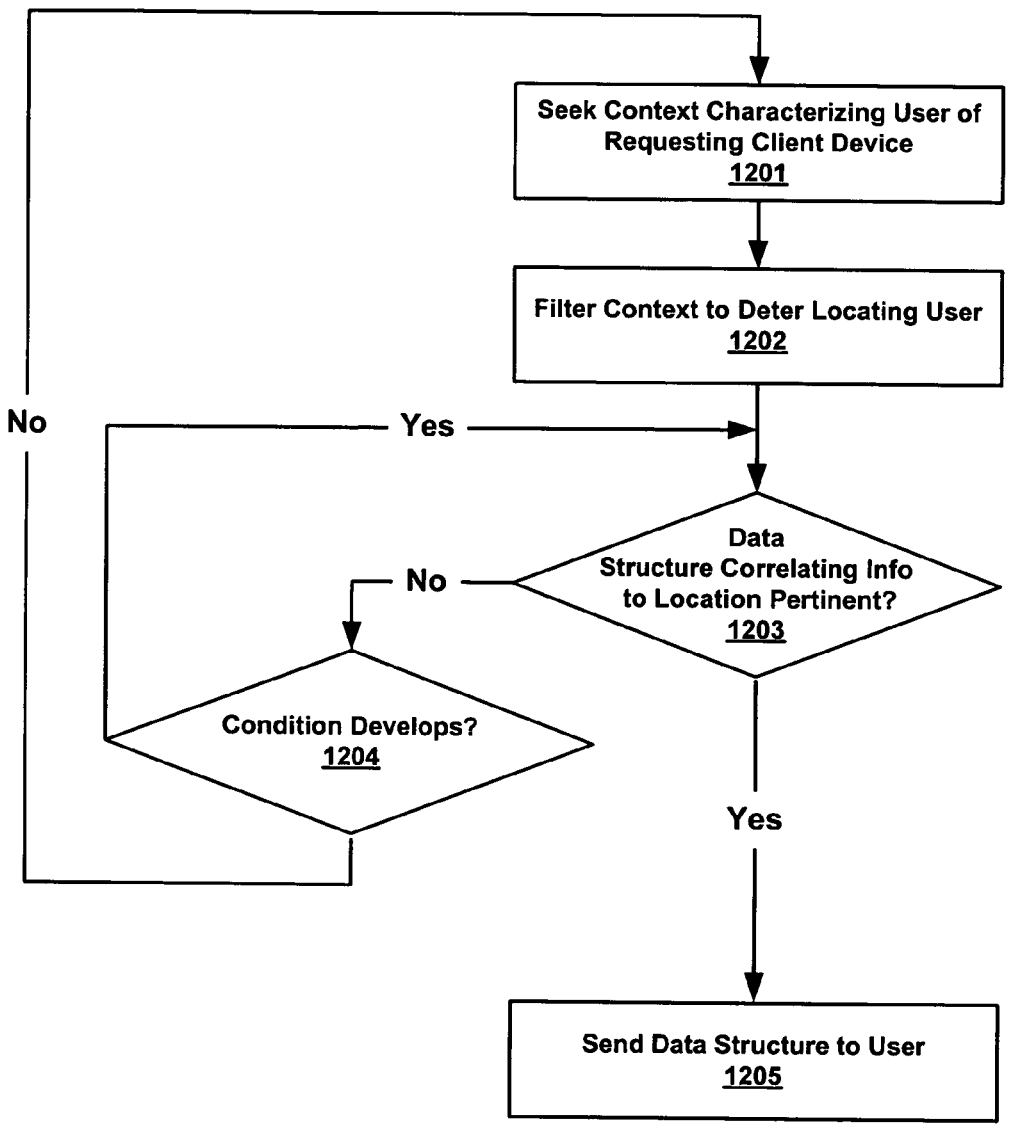
FIG. 12 is a flowchart of a process for providing dynamically pertinent information corresponding to a location, according to an embodiment of the present invention.

FIG. 12 is a flowchart of a network based process 1200 for selectively providing a data structure (e.g., data structure 1100; FIG. 11) to a client device, according to one embodiment of the present invention. Process 1200 begins with step 1201, wherein context is sought that characterizes a user of the client device.

The context comprises data in one embodiment and can be stored on the client device or elsewhere. The context can include, for instance, an attribute of the user that can be selected from among identity, profile, history, a preference, a credential, capability, an interest, and a privacy selection, or another characteristic.

In step 1202, in response to seeking the context, the context is filtered so as to deter locating the user. Advantageously, this serves to help protect the user's privacy. Upon filtering the context, it is determined from the context whether the data structure is pertinent to the user. If it is determined that the data structure is pertinent to the user, then in step 1204, the data structure is sent to the client device.

The context can change dynamically in response to a condition relating to the temporal pertinence of the information with respect to the context. If it is determined that the data structure is not pertinent, then in step 1205, it is determined whether a condition develops that renders the data structure pertinent. If it is determined that a condition develops that renders the data structure pertinent, then step 1203 is repeated. If it is determined that a condition has not developed that renders the data structure pertinent, then process 1200 loops back to step 1201.

In one embodiment, the receivability of the data structure to said client device is activated and deactivated in response to the condition. For instance, before the condition makes the information pertinent with respect to the context, the data structure is not sent. The condition can comprise a quality such as time, a locational aspect of said client device, or another condition. The locational aspect can comprise a state such as the directional orientation, tilt orientation, residing within a specified area of coverage, motion through a specified area of coverage, accessibility of the location to a position of the client device, or some other locationally relevant state of or relating to the client device. The condition can comprise a sequence of events occurring. In one embodiment, the area of coverage changes dynamically in response to the sequence of events. The processing for displaying downloaded virtual beacons can be done locally (e.g., at device 820; FIG. 8B) to help ensure privacy for users.

Thus, an embodiment of the present invention, a data structure disposed in a computer readable memory that provides information corresponding to a location, is thus described. While the present invention has been described in particular embodiments, it should be appreciated that the present invention should not be construed as limited by such embodiments, but rather construed according to the below claims.

What is claimed is:

1. A non-transitory computer readable storage medium having a data structure disposed therein for providing information corresponding to a geographic location, said data structure comprising:
a first data field for identifying said geographic location and positional data related to a physical location of said geographic location; and
a second data field associated with said first data field for containing said information, said second field is comprising a uniform resource locator, wherein a user can access said information;
wherein said first data field and said second data field are linked such that said data structure comprising said positional data and said uniform resource locator related to said physical location functions as a virtual beacon and is downloadable to a client device near said physical location such that said uniform resource locator is accessible by said user without browsing, wherein a physical location of said client device is not required to be transmitted;
said virtual beacon selectively provides a portion of said information to said client device on a network, wherein said portion is based on a context relating to a user of said client device; and
said context and said information is dynamically updated based on a condition relating to a temporal pertinence of said information.

2. The non-transitory computer readable storage medium as recited in claim 1 wherein said context is subject to filtering and wherein the filtering functions to deter locating said user.

3. The non-transitory computer readable storage medium as recited in claim 1 wherein the receivability of said data structure to said client device is activated or deactivated in response to said condition.

4. The non-transitory computer readable storage medium as recited in claim 3 wherein said condition comprises a quality selected from the group consisting of time and a locational aspect of said client device.

5. The non-transitory computer readable storage medium as recited in claim 4 wherein said locational aspect comprises a state selected from the group consisting of directional orientation, tilt orientation, motion through a specified area of coverage, and accessibility of said location to a position of said client device.

6. The non-transitory computer readable storage medium as recited in claim 5 wherein said condition comprises a sequence of events occurring and wherein said specified area of coverage changes dynamically in response to said sequence of events.

7. The non-transitory computer readable storage medium as recited in claim 2 wherein said context comprises an attribute of said user, said attribute selected from the group consisting of identity, profile, history, a preference, a credential, capability, an interest, and a privacy selection.

8. The non-transitory computer readable storage medium as recited in claim 2 wherein said client device comprises a portable computing device and wherein said context is stored on said portable computing device.

9. The non-transitory computer readable storage medium as recited in claim 2 wherein said first data field comprises a latitude and a longitude.

10. A network based system for selectively providing a data structure to a client device, said data structure having a first data field for identifying a geographic location and positional data related to a physical location of said geographic location and a second data field associated with said first data field containing information corresponding to said location, said second field is comprising a uniform resource locator, said network further comprising:
a filter disposed upon said client device and coupled to said network for accessing context stored at said client device and on the basis of said context determining that said data structure is pertinent to a user of said client device and wherein said filter functions to deter locating said user, wherein said context and said information is dynamically updated based on a condition relating to a temporal pertinence of said information, and wherein a physical location of said client device is not required to be transmitted;
a server coupled to said network for selectively furnishing a portion said data structure to said client device on the basis of said context and said determining, wherein said first data field and said second data field are linked such that said data structure comprising said positional data and said uniform resource locator related to said physical location is downloaded to said client device when said client device is near said physical location such that said uniform resource locator is accessible without browsing; and a database coupled to said server for storing a plurality of said data structures and providing said data structure to said server.

11. The system as recited in claim 10 wherein the receivability of said data structure to said client device is activated or deactivated in response to said condition.

12. The system as recited in claim 11 wherein said condition comprises a quality selected from the group consisting of time and a locational aspect of said client device.

13. The system as recited in claim 12 wherein said locational aspect comprises a state selected from the group consisting of directional orientation, tilt orientation, motion through a specified area of coverage, and accessibility of said location to a position of said client device.

14. The system as recited in claim 13 wherein said condition comprises a sequence of events occurring and wherein said specified area of coverage changes dynamically in response to said sequence of events.

15. The system as recited in claim 10 wherein said context comprises an attribute of said user, said attribute selected from the group consisting of identity, profile, history, a preference, a credential, capability, an interest, and a privacy selection.

16. A network based method for selectively providing a data structure, said data structure having a first data field for identifying a geographic location and positional data related to a physical location of said geographic location and a second data field associated with said first data field containing information corresponding to said location, said second field is comprising a uniform resource locator, to a client device, said method comprising:
   in response to a request from said client device, seeking context that characterizes a user of said client device;
   in response to said seeking, filtering said context at said client device to deter locating said user;
   upon said filtering, determining from said context that said data structure is pertinent to said user;
   in response to said determining, sending a portion of said data structure to said client device, wherein said portion is based on said context, wherein said first data field and said second data field are linked such that said data structure comprising said positional data and said uniform resource locator related to said physical location is sent to said client device when said client device is near said physical location such that said uniform resource locator is accessible without browsing; and
   dynamically updating said context and said portion of said data structure based on a condition relating to a temporal pertinence of said information and said portion of said data structure, wherein a physical location of said client device is not required to be transmitted.

17. The method as recited in claim 16 wherein the receivability of said data structure to said client device is activated or deactivated in response to said condition.

18. The method as recited in claim 17 wherein said condition comprises a quality selected from the group consisting of time and a locational aspect of said client device.

19. The method as recited in claim 18 wherein said locational aspect comprises a state selected from the group consisting of directional orientation, tilt orientation, motion through a specified area of coverage, and accessibility of said location to a position of said client device.

20. The method as recited in claim 19 wherein said condition comprises a sequence of events occurring and wherein said specified area of coverage changes dynamically in response to said sequence of events.

21. The method as recited in claim 16 wherein said context comprises an attribute of said user, said attribute selected from the group consisting of identity, profile, history, a preference, a credential, capability, an interest, and a privacy selection.

22. A non-transitory computer readable storage medium having a data structure disposed therein for providing information corresponding to a geographic location, said data structure comprising:
   a first data field for identifying said geographic location with respect to a point in three dimensional reference system related to a physical location of said geographic location, wherein said three dimensional reference system is based selectively on an absolute reference and a relative reference; and
   a second data field associated with said first data field for containing said information, said second field is comprising a uniform resource locator, wherein a user can access said information;
   wherein said first data field and said second data field are linked such that said data structure comprising said geographic location and said uniform resource locator related to said physical location functions as a virtual beacon and is downloadable to a client device near said physical location such that said uniform resource locator is accessible by said user without browsing and said virtual beacon selectively provides a portion of said information to said client device on said network, wherein said portion is based on a context relating to a user of said client device; and
   said context and said information is dynamically updated based on a condition relating to a temporal pertinence of said information, wherein a physical location of said client device is not required to be transmitted and is filtered at said client device to deter locating said user.

23. The non-transitory computer readable storage medium as recited in claim 22 wherein said first data field comprises a latitude, a longitude.

24. The non-transitory computer readable storage medium as recited in claim 22 wherein said first data field comprises a plurality of fields wherein said fields identify said geographic location, wherein said absolute reference comprises a plurality of coordinate systems, and wherein each field of said plurality of fields is defined in a separate coordinate system of said plurality of coordinate systems.

25. The non-transitory computer readable storage medium as recited in claim 22 wherein said first data field comprises a plurality of fields wherein said fields identify said geographic location, wherein said relative reference comprises a plurality of coordinate systems, and wherein each field of said plurality of fields is defined in a separate coordinate system of said plurality of coordinate systems.

26. The non-transitory computer readable storage medium as recited in claim 22 wherein said first data field comprises a plurality of fields wherein said fields identify said geographic location, wherein each field of said plurality of fields is defined in a separate coordinate system, and wherein a first field of said plurality of fields is defined based on said absolute reference and a second field of said plurality of fields is defined based on said relative reference.

* * * * *